(12) United States Patent
Lipski et al.

(10) Patent No.: US 8,027,337 B2
(45) Date of Patent: *Sep. 27, 2011

(54) SONET MULTIPLEXER CARD HAVING FRONT PANEL ACCESS TO ELECTRICAL AND OPTICAL CONNECTORS FOR USE IN COMPACT ENCLOSURE FOR SONET MULTIPLEXER CARDS

(75) Inventors: Bruce Lipski, Leesburg, VA (US); Gary M. Miller, Kearneysville, WV (US); David O. Corp, Clifton, VA (US)

(73) Assignee: Hubbell Incorporated, Shelton, CT (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/318,082

(22) Filed: Dec. 22, 2008

(65) Prior Publication Data

US 2009/0142054 A1 Jun. 4, 2009

Related U.S. Application Data

(63) Continuation of application No. 11/209,031, filed on Aug. 23, 2005, now Pat. No. 7,468,891, which is a continuation of application No. 10/448,463, filed on May 30, 2003, now Pat. No. 6,958,908.

(51) Int. Cl.
*H04L 12/50* (2006.01)
*H04J 3/22* (2006.01)
(52) U.S. Cl. .................... 370/358; 370/463; 370/467
(58) Field of Classification Search .......... 370/351, 370/357–360, 366, 367, 386–388, 463–467
See application file for complete search history.

(56) References Cited

U.S. PATENT DOCUMENTS

| | | | |
|---|---|---|---|
| 4,956,835 A | 9/1990 | Grover | |
| 5,185,736 A | 2/1993 | Tyrrell et al. | |
| 5,247,603 A | 9/1993 | Vidacovich et al. | |
| 5,460,441 A | 10/1995 | Hastings et al. | |
| 5,629,938 A | 5/1997 | Cerciello et al. | |
| 5,808,767 A | 9/1998 | Williams et al. | |
| 5,848,065 A | 12/1998 | Gorshe et al. | |

(Continued)

OTHER PUBLICATIONS

"O3D3 Miniature SONET Multiplexer," Pulse Communications Inc., pp. 1-16 (Jul. 2002).

(Continued)

*Primary Examiner* — Aung S Moe
*Assistant Examiner* — Kerri Rose
(74) *Attorney, Agent, or Firm* — Stacy J. Longanecker; Mark S. Bicks; Alfred N. Goodman

(57) ABSTRACT

A reduced size multiplexer and, in particular, a reduced size SONET multiplexer module is provided for use in a reduced size enclosure. The SONET multiplexer module has electrical and optical connectors on its faceplate to provide ease in access without having to remove the SONET multiplexer from the enclosure. The SONET multiplexer circuit is configured in a standard Type 400 mechanics circuit board arrangement. The SONET multiplexer module therefore can be inserted into an enclosure in a direction opposite to that in which the DS1 or DS3 connector projects from the face plate, so that the DS1 or DS3 connector remains freely accessible outside of the enclosure when the SONET multiplexer module is fully loaded into the enclosure. DS1 and DS3 cables and optical fibers can thus be easily coupled to the DS1 and DS3 and optical connectors, respectively, when the SONET multiplexer circuit is fully loaded into the enclosure.

6 Claims, 21 Drawing Sheets

U.S. PATENT DOCUMENTS

| | | | |
|---|---|---|---|
| 5,864,415 A | 1/1999 | Williams et al. | |
| 5,978,113 A | 11/1999 | Kight | |
| 6,005,699 A | 12/1999 | Tomooka et al. | |
| 6,046,832 A | 4/2000 | Fishman | |
| 6,088,224 A | 7/2000 | Gallagher et al. | |
| 6,125,111 A * | 9/2000 | Snow et al. | 370/360 |
| 6,175,490 B1 | 1/2001 | Papa et al. | |
| 6,217,228 B1 | 4/2001 | Samela et al. | |
| 6,272,154 B1 | 8/2001 | Bala et al. | |
| 6,331,933 B1 | 12/2001 | Rumney | |
| 6,332,198 B1 | 12/2001 | Simons et al. | |
| 6,389,013 B1 | 5/2002 | Doss et al. | |
| 6,390,831 B2 | 5/2002 | Shimada et al. | |
| 6,510,055 B1 | 1/2003 | Liu et al. | |
| 6,522,554 B1 | 2/2003 | Gomez et al. | |
| 6,522,673 B1 | 2/2003 | Williamson, III et al. | |
| 6,611,853 B2 | 8/2003 | Graafmans | |
| 6,707,686 B2 | 3/2004 | Fritz et al. | |
| 6,868,219 B2 | 3/2005 | Lipski et al. | |
| 6,956,874 B1 * | 10/2005 | Moore et al. | 370/535 |
| 7,058,012 B1 | 6/2006 | Chen et al. | |
| 7,111,072 B1 | 9/2006 | Matthews et al. | |
| 7,170,851 B1 | 1/2007 | Chen et al. | |
| 7,359,410 B2 | 4/2008 | Lipski et al. | |
| 7,379,481 B2 | 5/2008 | Lipski et al. | |
| 2002/0044567 A1 | 4/2002 | Voit et al. | |
| 2002/0049862 A1 | 4/2002 | Gladney et al. | |
| 2002/0097743 A1 * | 7/2002 | Baydar et al. | 370/463 |
| 2002/0101725 A1 | 8/2002 | Kaetsu et al. | |
| 2002/0165962 A1 | 11/2002 | Alvarez et al. | |
| 2002/0181896 A1 | 12/2002 | McClellan et al. | |
| 2003/0012184 A1 | 1/2003 | Walker, III et al. | |
| 2003/0026525 A1 | 2/2003 | Alvarez | |
| 2006/0211294 A1 | 9/2006 | Lipski et al. | |

OTHER PUBLICATIONS

"O3D3-OC3 to DS3 Miniature SONET Multiplexe," Pulse Communications Inc., pp. 1-2 (Feb. 2001).

Adtran, Inc., Adtran OCU 45, Dec. 2000, Tektronix, SONET Telecommunications Primer, pp. 13, Aug. 2001.

"SONET Telecommunications Standard Primer," pp. 35, Copyright 2001, www.tektronix.com/optical.

* cited by examiner

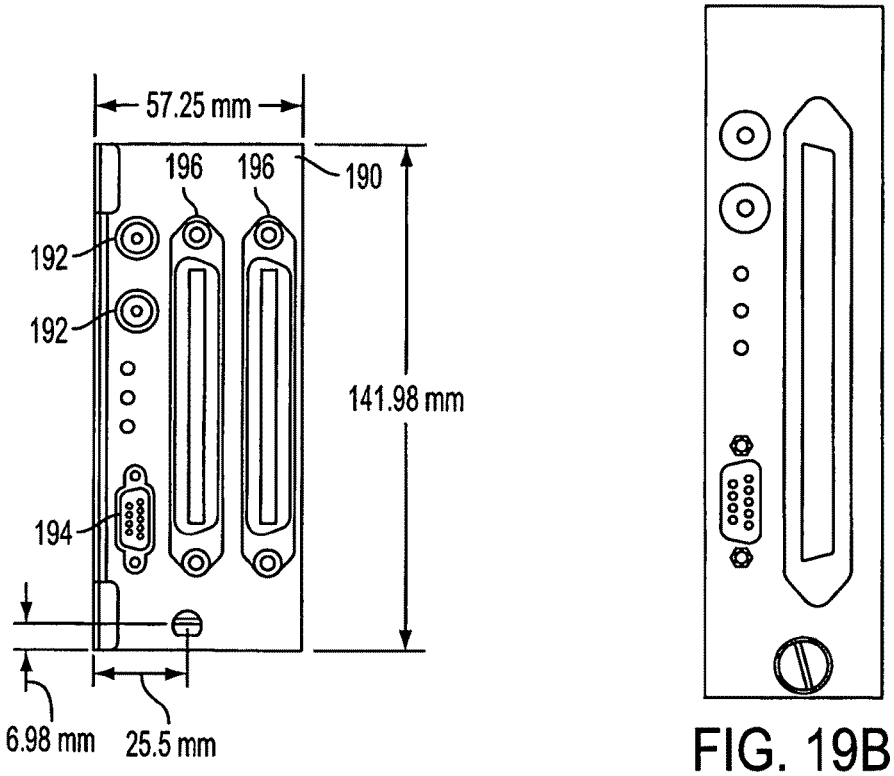
FIG. 19A
FIG. 19B
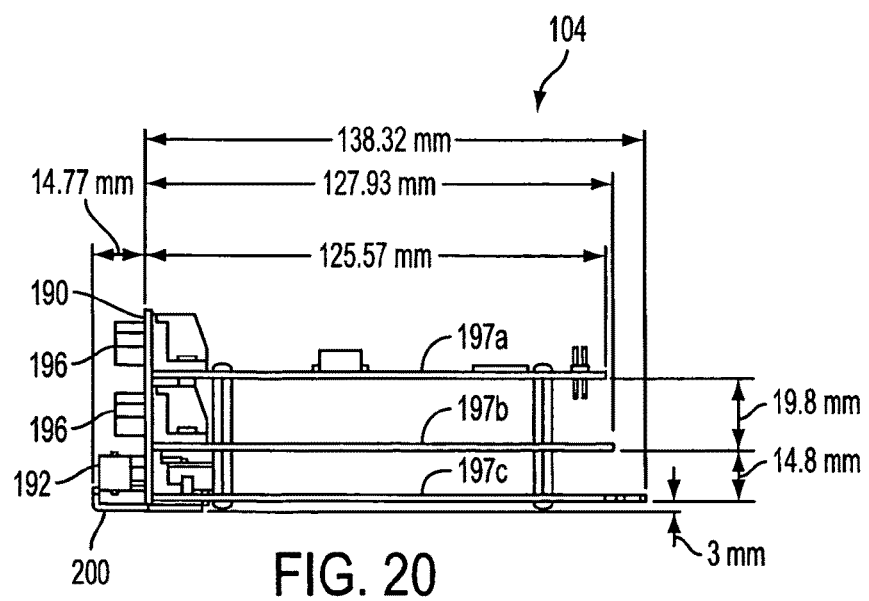
FIG. 20

SONET MULTIPLEXER CARD HAVING FRONT PANEL ACCESS TO ELECTRICAL AND OPTICAL CONNECTORS FOR USE IN COMPACT ENCLOSURE FOR SONET MULTIPLEXER CARDS

This application is a continuation of U.S. patent application Ser. No. 11/209,031, filed Aug. 23, 2005, now U.S. Pat. No. 7,468,891 which is a continuation of U.S. patent application Ser. No. 10/448,463, filed May 30, 2003, now U.S. Pat. No. 6,958,908.

CROSS REFERENCE TO RELATED APPLICATIONS

In addition to U.S. Pat. No. 6,958,908, related subject matter is disclosed in U.S. patent application of Bruce Lipski et al., entitled "Apparatus and Method for Increasing Optical Density of SONET Multiplexer Using Integral Components" (now issued as U.S. Pat. No. 7,359,410); in U.S. patent application of Bruce Lipski et al., entitled "SONET Multiplexer Having Front Panel Access to Electrical and Optical Connectors and Method for Using Same" (now issued as U.S. Pat. No. 6,868,219); and in U.S. patent application of Bruce Lipski et al., "Apparatus And Method For Automatic Provisioning of SONET Multiplexer" (now issued as U.S. Pat. No. 7,379,481); the entire contents of each of these patents being expressly incorporated herein by reference.

FIELD OF THE INVENTION

The present invention relates to interchangeable SONET multiplexer cards for uses in a compact enclosure and a method for using the same. More particularly, the present invention relates to one or more reduced size SONET multiplexer cards having front panel access to electrical and optical connectors such as DS1-DS3 SONET multiplexer cards, along with other cards such as wave division multiplexing cards, which can be received in a compact enclosure and a method for using the same.

BACKGROUND OF THE INVENTION

As the demand for high bandwidth, high bit rate communications increases (e.g., to accommodate multimedia and wireless applications, in particular), fiber optics technology is rapidly advancing to supply the capacity. SONET (i.e., Synchronous Optical Network) is the communication hierarchy that has been specified by the American National Standards Institute (ANSI) as a standard for a high-speed digital hierarchy for optical fiber. SONET defines optical carrier (OC) levels and electrically equivalent synchronous transport signals (STSs) for the fiber-optic based transmission hierarchy. The SONET standard is described in more detail in ANS T1.105 and T1.106, and in Telcordia Generic Requirement GR-253-CORE, which are incorporated herein by reference.

Before SONET, fiber optic systems in the public telephone network used proprietary architectures, equipment, line codes, multiplexing formats and maintenance procedures. The users of this equipment (e.g., Regional Bell Operating Companies and inter-exchange carriers (IXCs) in the United States, Canada, Korea, and Taiwan, among others countries) desired standards such as SONET so they could employ equipment from different suppliers without experiencing incompatibility problems.

SONET defines a technology for carrying many signals of different capacities through a synchronous, flexible, optical hierarchy using a byte-interleaved multiplexing scheme to simplify multiplexing and provide end-to-end network management. The base signal in SONET is a Synchronous Transport Signal level-1 (STS-1) which operates at 51.84 Megabits per second (Mbps). Higher-level SONET signals are summarized in the following table:

TABLE 1

| SONET Hierarchy | | |
|---|---|---|
| Signal | Bit Rate | Capacity |
| STS-1, OC-1 | 51.840 Mb/s | 28 DS1s or 1 DS3 |
| STS-3, OC-3 | 155.520 Mb/s | 84 DS1s or 3 DS3s |
| STS-12, OC-12 | 622.080 Mb/s | 336 DS1s or 12 DS3s |
| STS-48, OC-48 | 2488.320 Mb/s | 1344 DS1s or 48 DS3s |
| STS-192, OC-192 | 9953.280 Mb/s | 5376 DS1s or 192 DS3s |
| STS-768, OC-768 | 39813.12 Mb/s | 21504 DS1s or 768 DS3s |

Thus, each SONET STS-N electrical signal has a corresponding OC-N optical signal. The OC-N signals are created by converting the STS-N electrical signal to an optical signal. The SONET standard establishes a multiplexing format for using any number of 51.84 Mbps signals as building blocks. For example, an OC-3 (Optical Carrier, Level 3) is a 155.52 Mbps signal (i.e., 3 times 51.84 Mbps), and its electrical signal counterpart is referred to as an STS-3 signal. The STS-1 signal carries a DS3 signal or a number of DS1 or other lower level signals. A SONET STS-3 signal is created by concatenating STS-1 signals.

Telecommunication equipment at central offices (COs), remote terminals (RTs), wireless communication cell sites and other equipment locations is frequently deployed as one or more multi-shelved bays with multiple shelves, wherein each shelf is configured to receive a plurality of communications cards. A backplane is provided in each bay for communication between its cards and shelves, as well as for interbay communication. One of the more common types of equipment to be found at these equipment sites is SONET multiplex equipment which takes lower-rate (tributary) signals, such as DS1 (1.5 Mbps), DS3 (45 Mbps), OC-1 (51.84 Mbps), or OC-3 (155.52 Mbps), and time division multiplexes them into a higher-rate signal such as OC-3 or OC-12 (622.08 Mbps). The SONET multiplex equipment also performs the corresponding demultiplex function of recovering the lower rate tributary signals from an incoming higher-rate signal.

Telecommunications companies are eager to provide as much performance as possible from their existing infrastructure. Their telecommunications systems are primarily based on the DS1 electrical signal hierarchy that uses DS0 data. A DS1 signal is comprised of 24 multiplexed DS0 voice or data channels. To provide capacity that meets the afore-mentioned demand for more bandwidth and high bit rates, telecommunications companies need equipment that is based on a higher data rate such as DS3 in which DS1 signals are the base signal for data channel multiplexing, as opposed to DS0 signals.

Problems with existing equipment managing DS1 and DS3 traffic, however, are numerous. For example, DS1 and DS3 hierarchy-based equipment requires more bay and shelf space in CO, RT, cell sites and other locations where equipment space is already a limited commodity, where bays and shelves are already crowded (e.g., many shelf card slots are filled with a card), and where room to add equipment with new features is very limited or essentially nonexistent.

In addition, previous generations of SONET and asynchronous multiplex equipment have dedicated fixed portions of an equipment shelf to different types/rates of services. For example, separate portions of the shelf are typically reserved for DS1, DS3, and OC3 interface units. Dedicating specific portions of the shelf to specific service types reduces the flexibility of the shelf, and typically leaves wasted shelf space for any given application.

Also, access to the optical connectors on existing multiplexer cards is typically on the front of a card, while access to the electrical connectors is on the back of the shelf. In equipment locations were space is limited, it can be difficult for human operators to gain access to the backs of card slots in a shelf of an equipment bay. A need therefore exists for SONET multiplexer equipment having a reduced form factor, with nondedicated card slots, and with front panel access to both electrical connectors and optical connectors.

To illustrate these disadvantages of existing SONET multiplex equipment, reference will now be made to FIG. 1 which illustrates a Fujitsu SONET multiplexer 10 (i.e., model FLM-150). The Fujitsu multiplexer 10 requires an entire shelfin a communications bay and dedicated card slots. For example, several cards are needed for DS1 to DS3 multiplexing, several cards are needed for DS3 to OC3 processing, and so on. Thus, a need exists for a SONET multiplexer having standard functionality, yet requiring less equipment space.

The Fujitsu multiplexer 10 is not easily set up or provisioned. The Fujitsu multiplexer 10 is designed to be everything to everyone in the optical communications environment. Since it is not designed to be compatible with any one particular system, it provides hundreds of choices to the user and must be substantially configured by a user operating a provisioning application on a computer (e.g., a personal computer or PC) before it can even run data through it. The installation, set up and provisioning manual for the Fujitsu multiplexer 10 is long and considerable training is needed for the user to be able to configure and operate the unit. Further, after such a lengthy and involved configuration phase, the unit may not be subsequently easily reprovisioned to accommodate a change in the configured data paths. This aspect of the Fujitsu multiplexer 10 renders it very cumbersome. Thus, a need exists for SONET multiplexing equipment that requires minimal set up and provisioning, and minimal or no user training. Further, a need exists for SONET multiplexing equipment that does not require connecting the equipment to a computer for provisioning, and that automates much of the provisioning process to simplify it for the user. In addition, a need exists for SONET multiplexing equipment that simplifies provisioning to allow reconfiguration of the equipment for flexible use.

Also, to use the Fujitsu multiplexer 10 in different applications such as a drop or drop and continue (e.g., ring) application requires more plug-in units, which increases cost, and requires more set up and provisioning. A need exists for a SONET multiplexer that can be deployed in different applications with greater functionality, little or no provisioning, and a minimal number of units to minimize cost and malfunctions due, for example, to failed electronics. For example, if four Fujitsu multiplexers units were to be deployed in a ring configuration, the Fujitsu units would require substantial provisioning to instruct the unit regarding which data paths are being dropped and continued and how to cross-connect at each node, as well as alarm conditions, among other configuration data. Thus, a need exists for SONET multiplexing equipment that simplifies provisioning to allow configuration of the equipment for flexible use in different applications.

Providing redundancy of optical paths can present a problem where there is limited equipment space since additional circuit packs are used in competing SONET multiplexers.

Reference is now made to FIG. 2, which depicts another existing SONET multiplexer that is available from Adtran, Inc. The Adtran SONET multiplexer is the Total Access OPTI-3 model which converts OC3 to three DS3s and consists of a rack-mounted shelf device.

SONET multiplexers generally provide redundancy of data paths to enable continued transmission of data after an optical path failure. With continued reference to FIG. 2, a conventional SONET system 12 employs plural multiplexers 20, 21' and 22, 22' at each of the nodes 14 and 16, respectively. A path 18 is selected as the primary path and a secondary path 18, is used in the event of primary path failure. In a 1:n redundancy system, wherein n is an integer, n paths are available and n−1 paths are used with the remaining path being a spare. A 1:n system requires communication between the multiplexers to establish which path(s) are in use and which path(s) are reserved for use following a path failure. In a 1+1 redundancy system, the path is selected based on whichever of the two paths is working and communication between the multiplexers regarding the selected redundant path is required.

Configuring a SONET system with redundancy using the Adtran multiplexer requires at least four multiplexers 20, 20', 22, 22' (i.e., two per node for two optical paths between the nodes). This redundant configuration is disadvantageous over a system having only a single optical path between two multiplexers, and therefore no redundancy, because it requires twice the equipment space and twice the cost for the extra two multiplexers. Further, the redundant system is less reliable in terms of the increased likelihood for electronics failure or equipment failure due to heat, for example, due to the additional multiplexer electronics. A need exists for a SONET multiplexer that provides redundancy while minimizing equipment space and cost and maximizing reliability.

The limitations of the known systems discussed above also render those systems difficult to use in $3^{rd}$ Generation (3G) wireless services. In particular, the costs and complexities of delivering the known DS3 signals as well as delivery of DS1 signals over fiber for lightning isolation to cell sites have limited their ability to be deployed in 3G systems. For example, severely limited cabinet or hut space would require expensive new enclosures and power supplies to run the known DS1 and DS3 signals. Furthermore, because 3G systems require upgrades to numerous cell cites, costs related to the time consuming provisioning and interconnect of traditional SONET equipment expand rapidly. Alternative fiber optic systems that can be used are either exorbitantly expensive or limited to point-to-point rather than efficient drop-and-continue topologies. In addition, future growth has been limited by large up-front equipment investments or products that are limited to supporting only 3 DS3s. Hence, a need exists for a small, fast, easy to use SONET equipment that is scalable and is capable of supporting integral drop-and-continue applications.

SUMMARY OF THE INVENTION

The present invention provides interchangeable SONET multiplexer cards for use in a compact enclosure or telecommunications bay equipment shelf and a method for using the same.

The present invention further provides one or more reduced size SONET multiplexer cards having front panel access to electrical and optical connectors such as DS1-DS3 multiplexer cards, along with other cards such as wave division multiplexing cards, which are adapted for use in a reduced size enclosure or telecommunications bay equipment shelf, and a method for using the same. For example, the compact enclosure assembly or telecommunications bay equipment shelf comprises a plurality of openings therein, each adapted to interchangeably receive a reduced size SONET multiplexer card configured in a standard Type 200 or Type 400 mechanics circuit board arrangement.

The SONET multiplexer has a limited set of switches. Remaining parameters are set up as defaults and require no provisioning on the part of the user.

In accordance an embodiment of the present invention, a SONET multiplexer comprises: (1) at least one OC3 port operable to receive and transmit optical signals; (2) at least one lower rate tributary signal port operable to receive and transmit electrical signals; (3) an optical interface to receive an optical signal via the at least one OC3 port and convert it into an electrical signal; (4) a SONET overhead terminator configured to locate SONET frames in the electrical signal received from the optical interface and extract selected overhead bytes in the SONET frames; (5) a mapper operable to use data from the electrical signal received from the optical interface and the selected overhead bytes to generate a plurality of lower rate tributary signal streams; and (6) a line interface unit operable to convert the lower rate tributary signal streams into respective analog signals for transmission from the at least one lower rate tributary signal port, the line interface unit being operable to receive analog signals via the at least one lower rate tributary signal port and convert them to corresponding digital signals, the mapper being operable to format the digital signals as a SONET stream, the SONET overhead terminator being operable to append selected overhead bytes to the SONET stream for transmission via the optical interface and the at least one OC3 port. No provisioning is needed to configure the SONET multiplexer to transport data between the at least one OC3 port and the at least one lower rate tributary signal port.

In accordance with an aspect of the present invention, a lower rate tributary signal cable is connected to the lower rate tributary signal port, and the mapper and the line interface unit are operable to automatically add a lower rate tributary signal received via the cable without requiring provisioning.

BRIEF DESCRIPTION OF THE DRAWINGS

These and other objects, advantages and novel features of the present invention will be readily appreciated from the following detailed description when read in conjunction with the accompanying drawings, in which:

FIG. 19a is a front view of the D3-28D1 module shown in FIG. 17;

FIG. 19b is a front view of the D3-14D1 module, which is similar to the D3-28D1 module but has only a single 64 pin connector;

FIG. 20 is bottom view of the D3-28D1 module shown in FIG. 17;

DETAILED DESCRIPTION OF THE EXEMPLARY EMBODIMENTS

Figure 1:
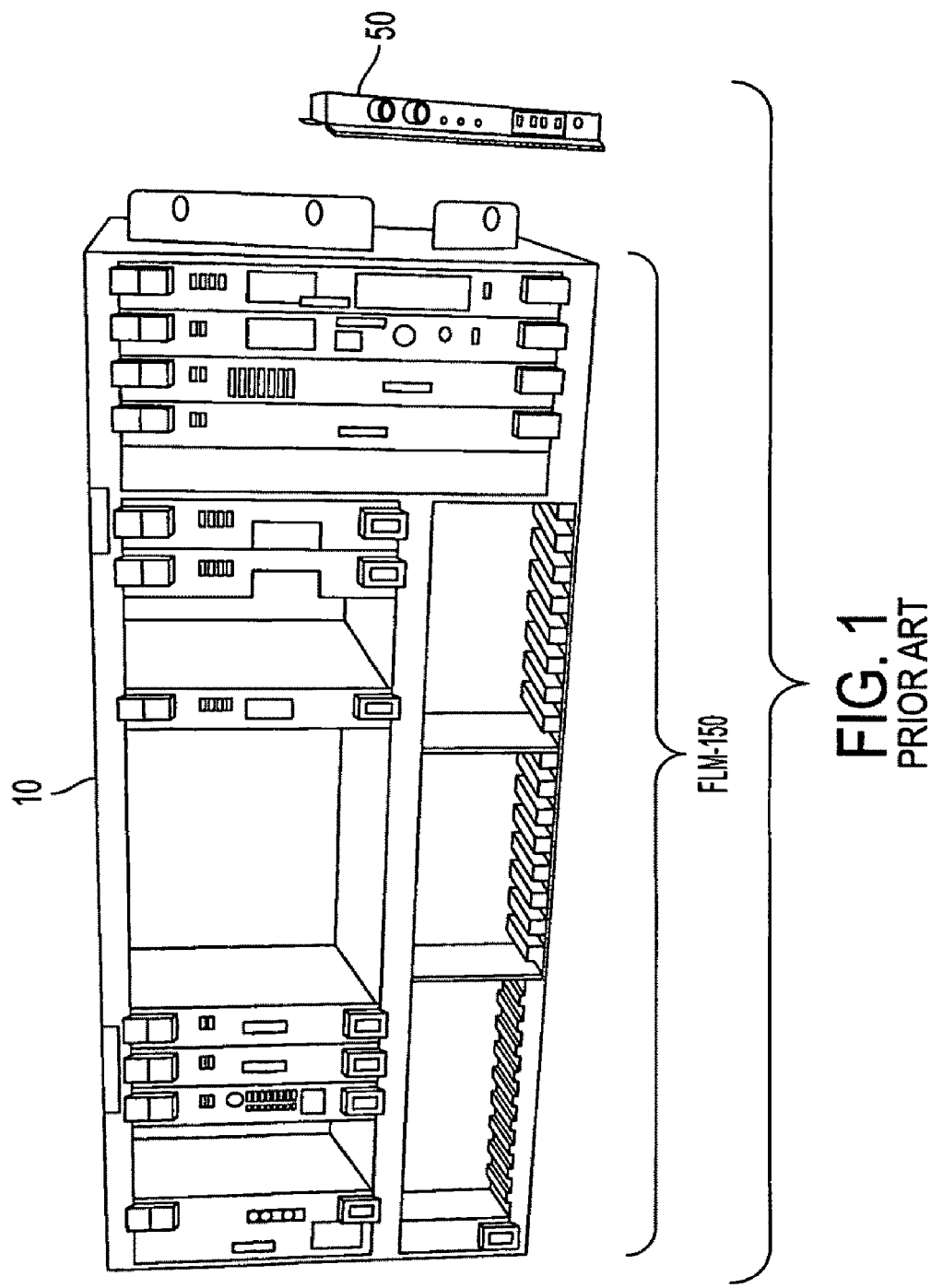
FIG. 1 depicts a conventional SONET multiplexer.
Figure 2:
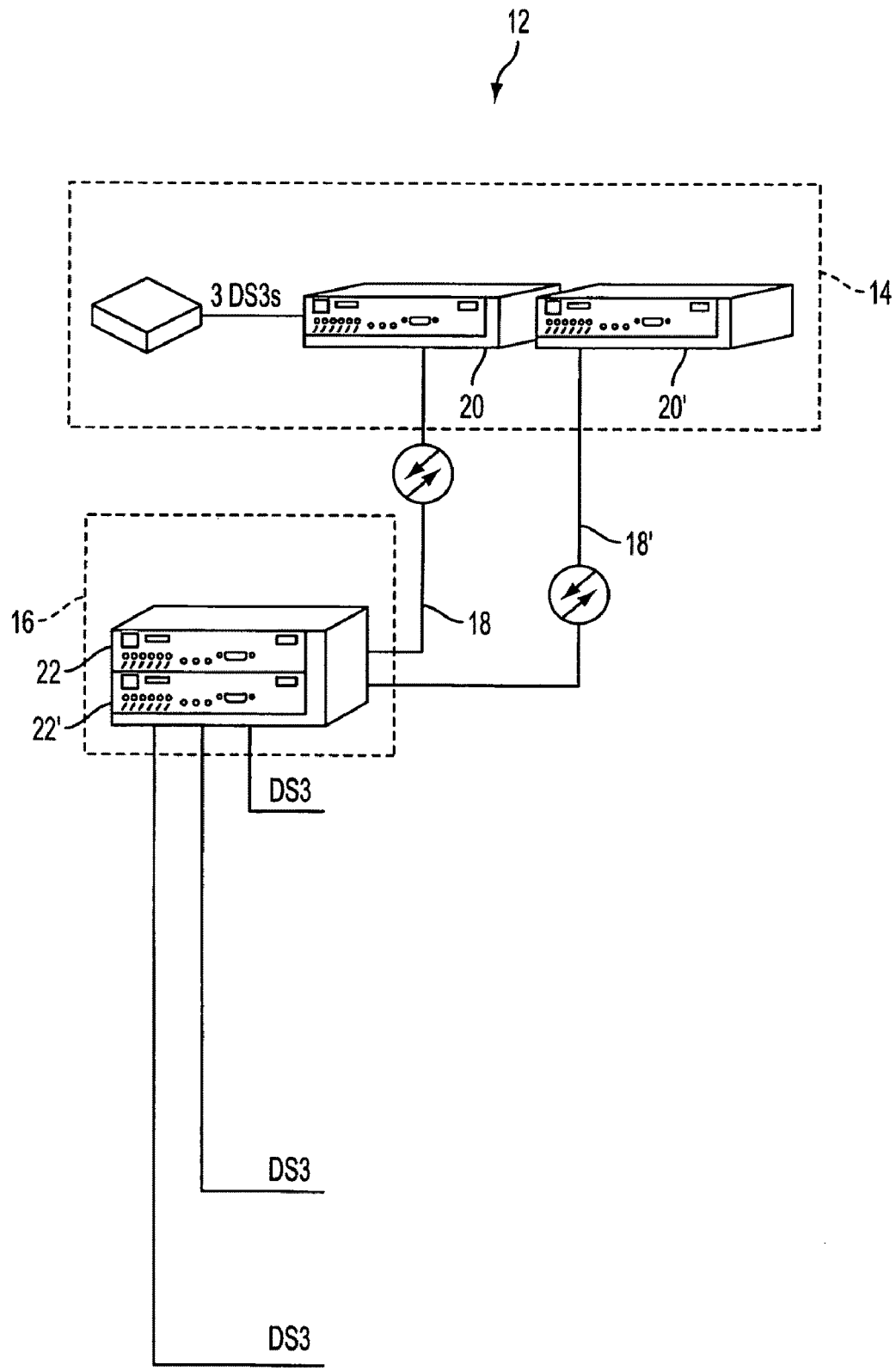
FIG. 2 depicts conventional SONET multiplexers configured for optical redundancy.
Figure 3:
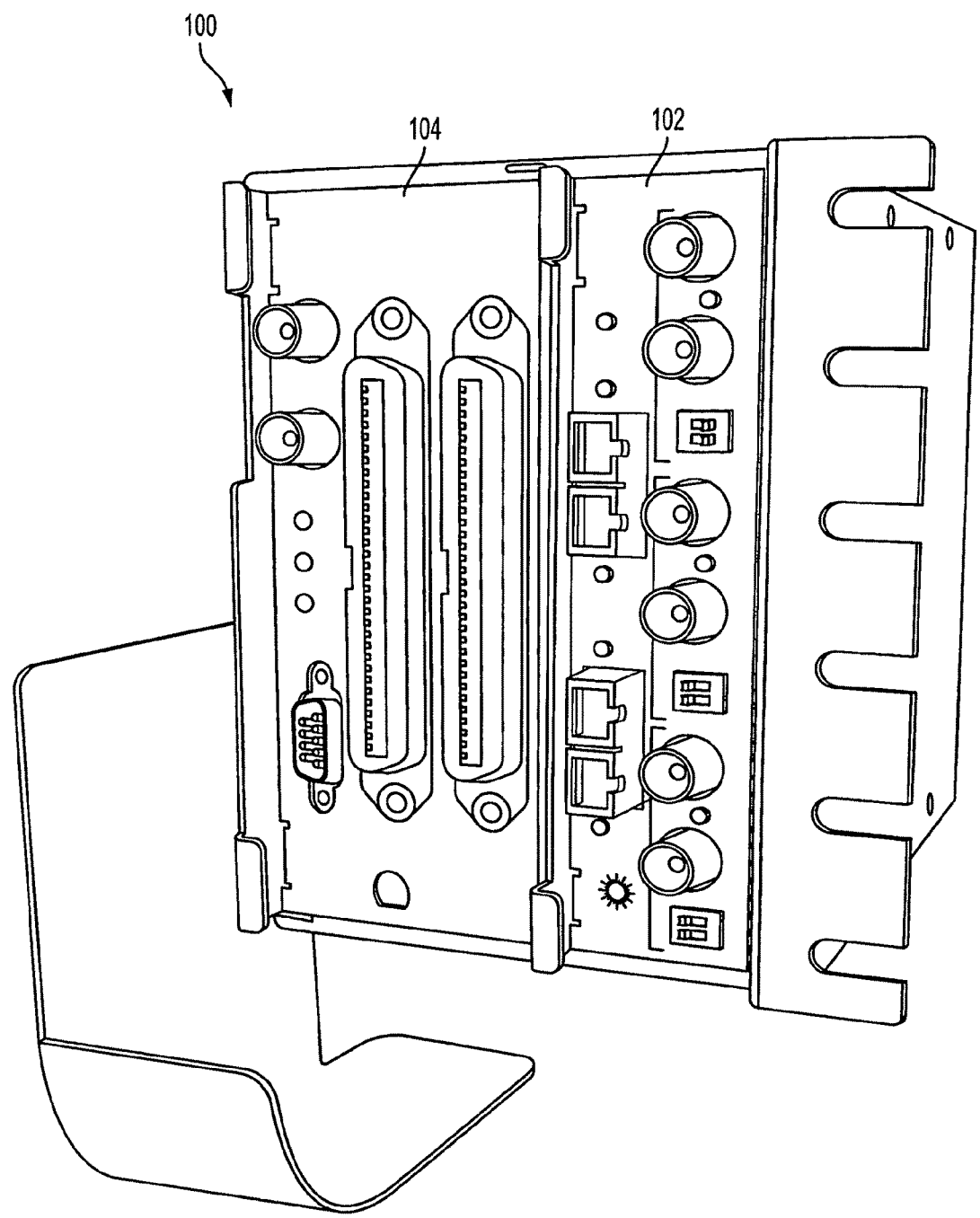
FIG. 3 is a perspective view of a reduced-sized enclosure for providing SONET and other multiplexing capabilities according to an embodiment of the present invention.

FIG. 3 is a perspective view of a reduced-size assembly 100 for mounting SONET and other multiplexing equipment to achieve DS3 and other multiplexing capabilities according an embodiment of the present invention. As described in more detail below, the assembly 100 is capable of receiving different combinations of modules, such as, but not limited to, O3-3D3, O3-3D3P, DS3 Express, D3-14D1, D3-28D1, and WDM modules, depending on the type of application and the types of interfaces required.

Figure 4:
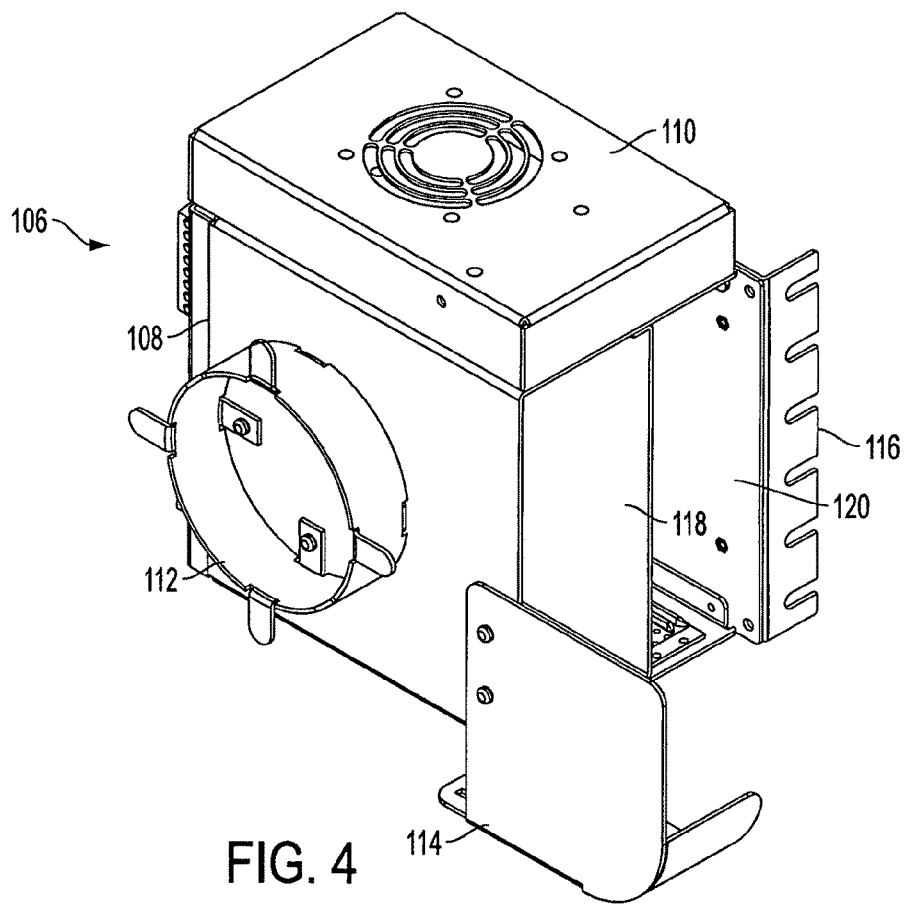
FIG. 4 is a front perspective view of the enclosure shown in FIG. 3.

In the example shown in FIG. 3, an O3-3D3 module 102 and a D3-28D1 module 104 are removably installed in the assembly 100. As shown in FIG. 4, the assembly 100 includes an enclosure assembly 106 that can be made of aluminum, anodized steel or any other suitable material. In this example, the enclosure assembly 106 includes an enclosure 108 on top of which is mounted a fan 110 for cooling the modules inserted in the enclosure 108. The enclosure 108 has a cable fiber management assembly 112 for keeping a maintenance loop of fiber optic or coaxial cable (not shown) since there is normally cable slack and conventional equipment lacks this capability to store the slack, relying upon external slack storage instead. The enclosure 108 further includes optional cable guard 114 that can be installed on the enclosure 108 by screws, rivets or the like to prevent mechanical cable damage. The enclosure also includes a mounting angle 116 for assisting in the mounting of the enclosure in a larger rack (not shown). The enclosure includes provisioning for wall mounting as well.

Figure 5:
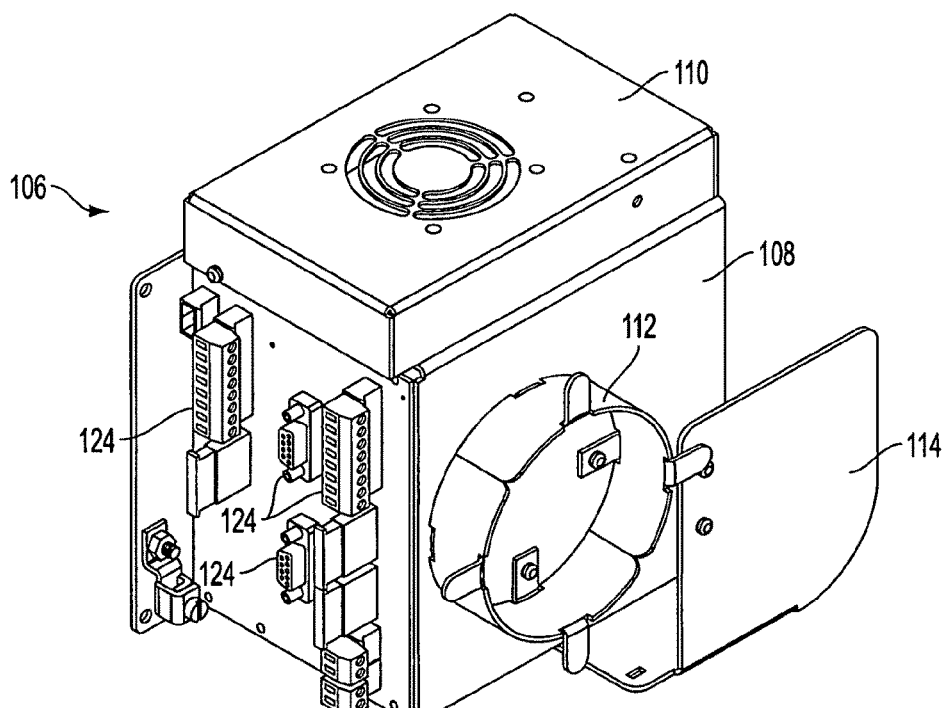
FIG. 5 is a rear perspective view of the enclosure shown in FIG. 3.
Figure 6:
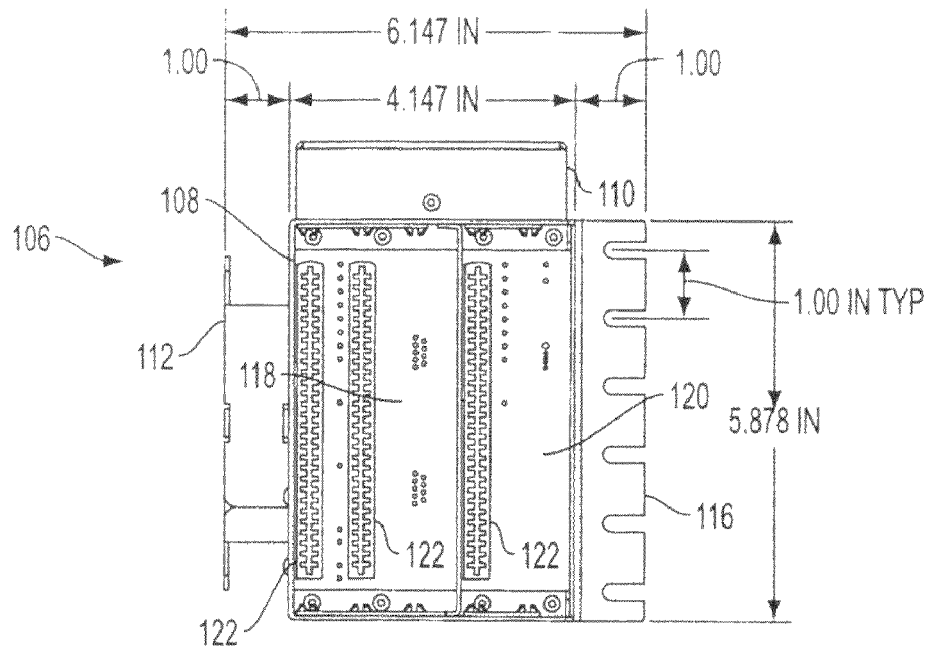
FIG. 6 is a front view taken along lines 4-4 in FIG. 4 showing the internal connectors of the enclosure.
Figure 7:
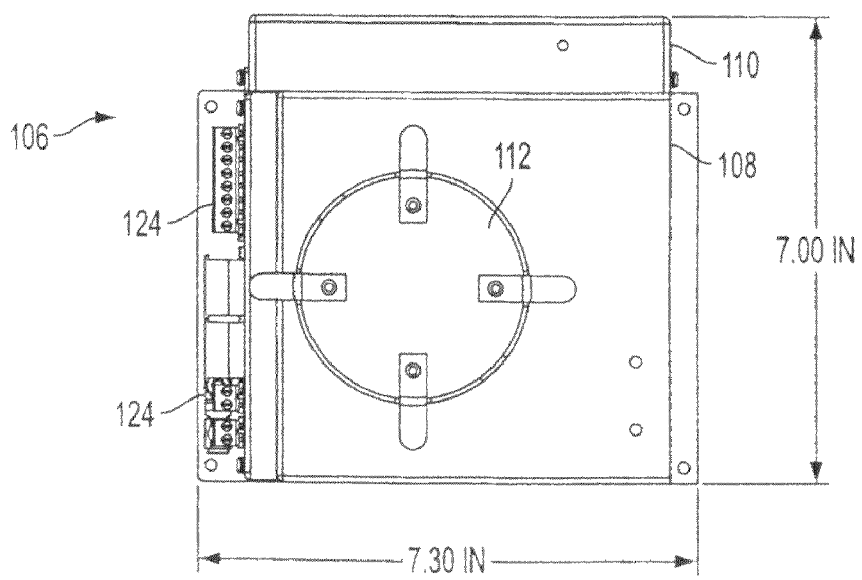
FIG. 7 is a left-side view of the enclosure shown in FIG. 4.
Figure 8A:
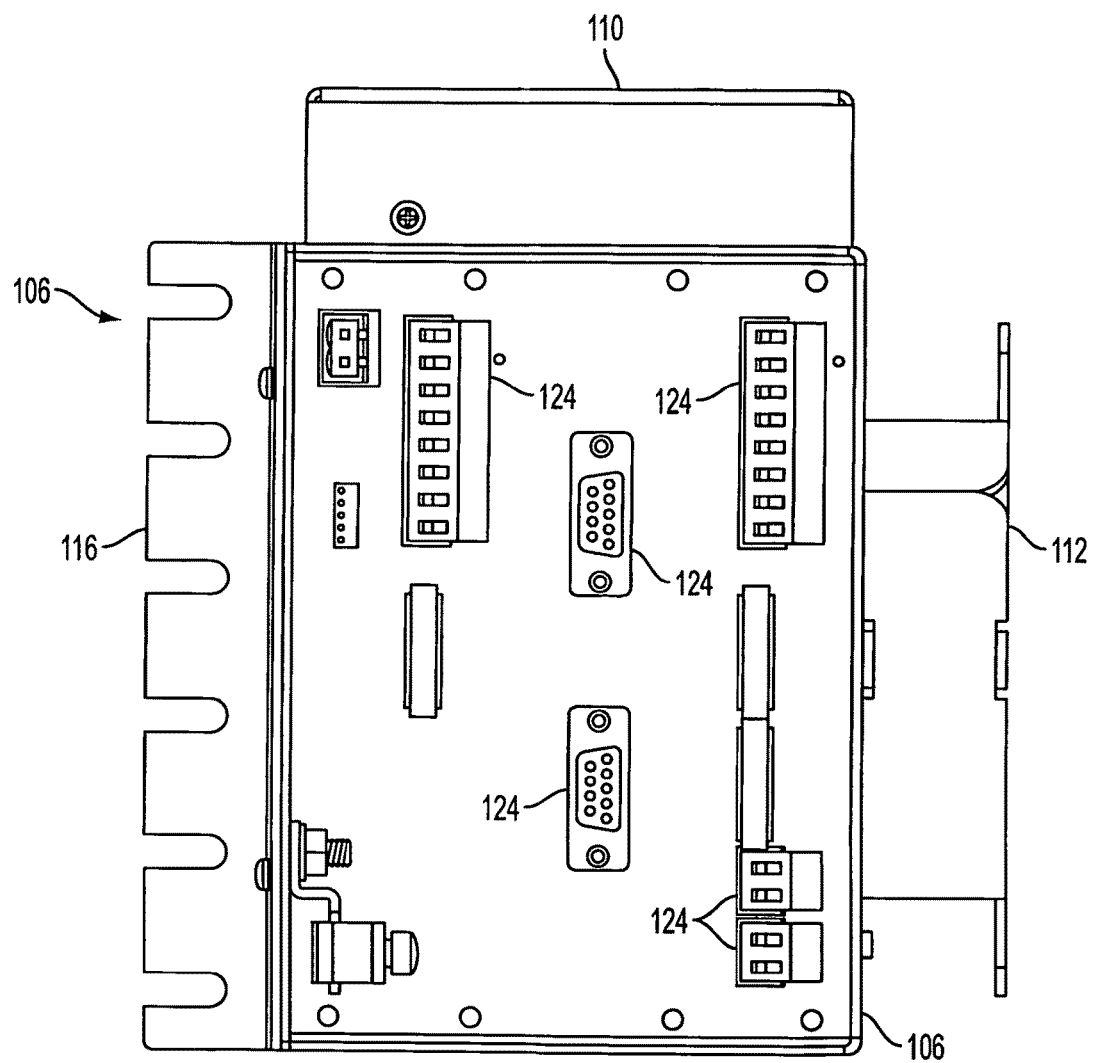
FIGS. 8a and 8b are rear views of the enclosure shown in FIG. 4.
Figure 8B:
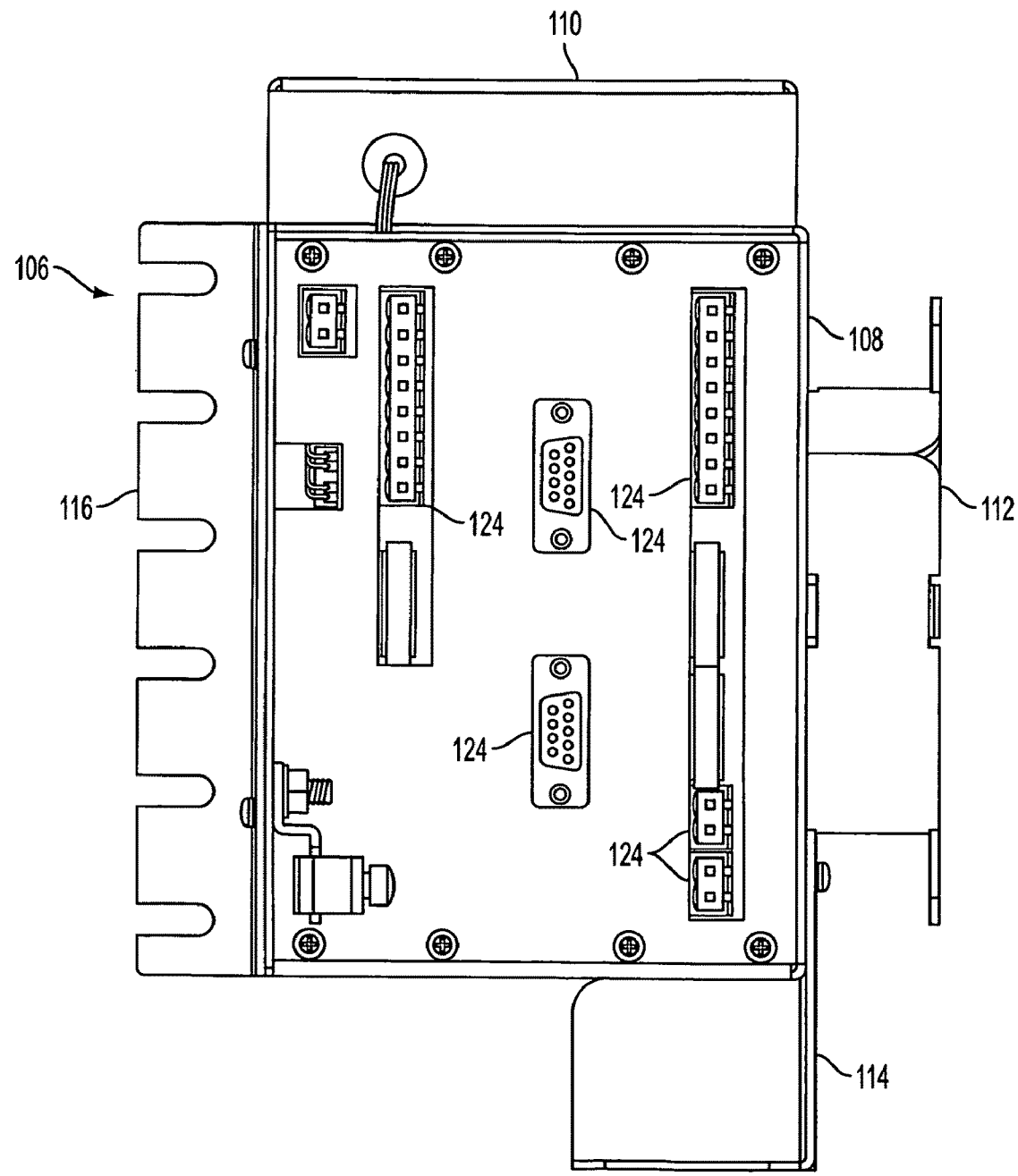
Figure 9:
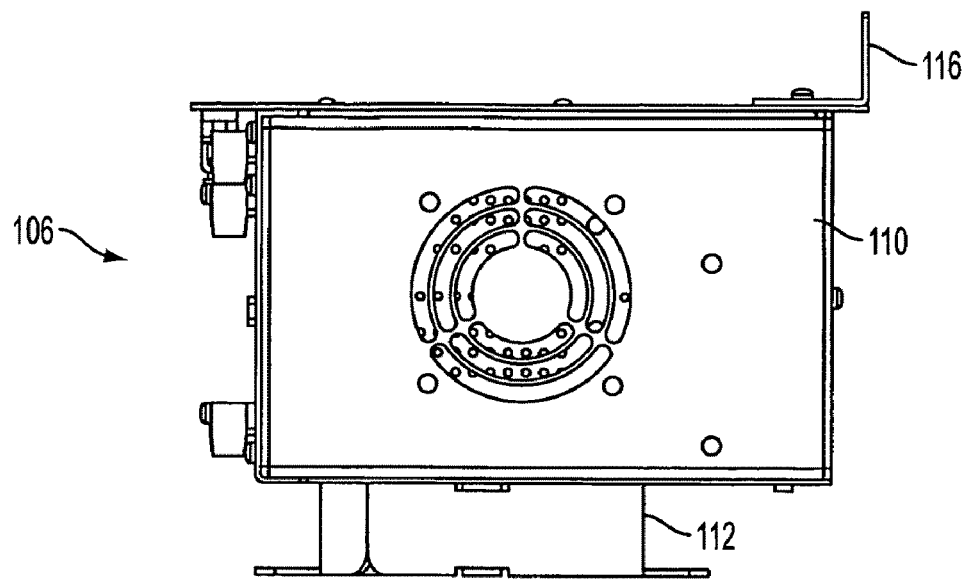
FIG. 9 is a top view of the enclosure shown in FIG. 4.
Figure 10:
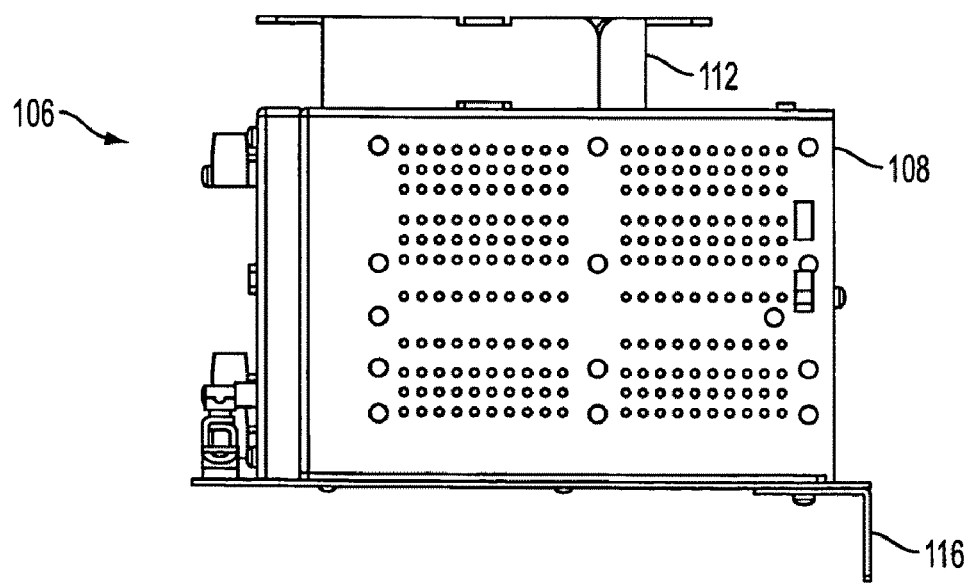
FIG. 10 is a bottom view of the enclosure shown in FIG. 4.

As shown in FIGS. 4 and 6, the front of the enclosure 106 has openings 118 and 120. As shown in FIG. 6 in particular, three connectors 122 are mounted inside the openings 118 and 120 on the rear panel of the enclosure 106, and are electrically connected to external connectors 124 as shown in FIGS. 5 and 7 through 10. Accordingly, as discussed in more detail below, when the modules are loaded into openings 118 and 120, the connectors on the back ends of the modules mate with the respective connectors 122 in the enclosure 108, and thus provide electrical connectivity to the external connectors 124.

As shown in FIGS. 6-9, in this example, the enclosure 108 has an overall height of 5.878 inches (about 5.9 inches) without the fan 110, and the enclosure assembly 106 has an overall height of 7.000 inches (about 7.0 inches) with the mounted fan 110. The enclosure 108 has an overall width of 6.147 inches (about 6.1 inches) taking into account the fiber management assembly 112 and the mounting angle 116, an overall depth of 7.30 inches (about 7.30 inches), and an overall width of 4.147 inches (about 4.1 inches) without the fiber management assembly 112 and mounting angle 116. As indicated, the fiber management assembly 112 projects 1.000 inches (about 1 inch) from the left side of the enclosure 108, and is 1.743 inches in diameter, and the mounting angle 116 projects 1.000 inches (about 1 inch) from the right side of the enclosure 108. The slots 117 in the mounting angle 116 are spaced 1.00 inches apart as indicated in FIG. 6. Accordingly, the dimensions of the enclosure assembly 106 enable the assembly 100 to be easily deployed, for example, at cell sites in a 3G network. The enclosure assembly 106 can be rack mounted as are conventional assemblies, or can be mounted on practically any suitable surface, such as at the top or side of a larger assembly, a wall of a room, on a table or desk top, and so on. It is noted that all dimensions given above can be viewed as approximate. However, in this embodiment, the dimensions can be viewed as the maximum dimensions which should not to be exceeded.

Figure 13:
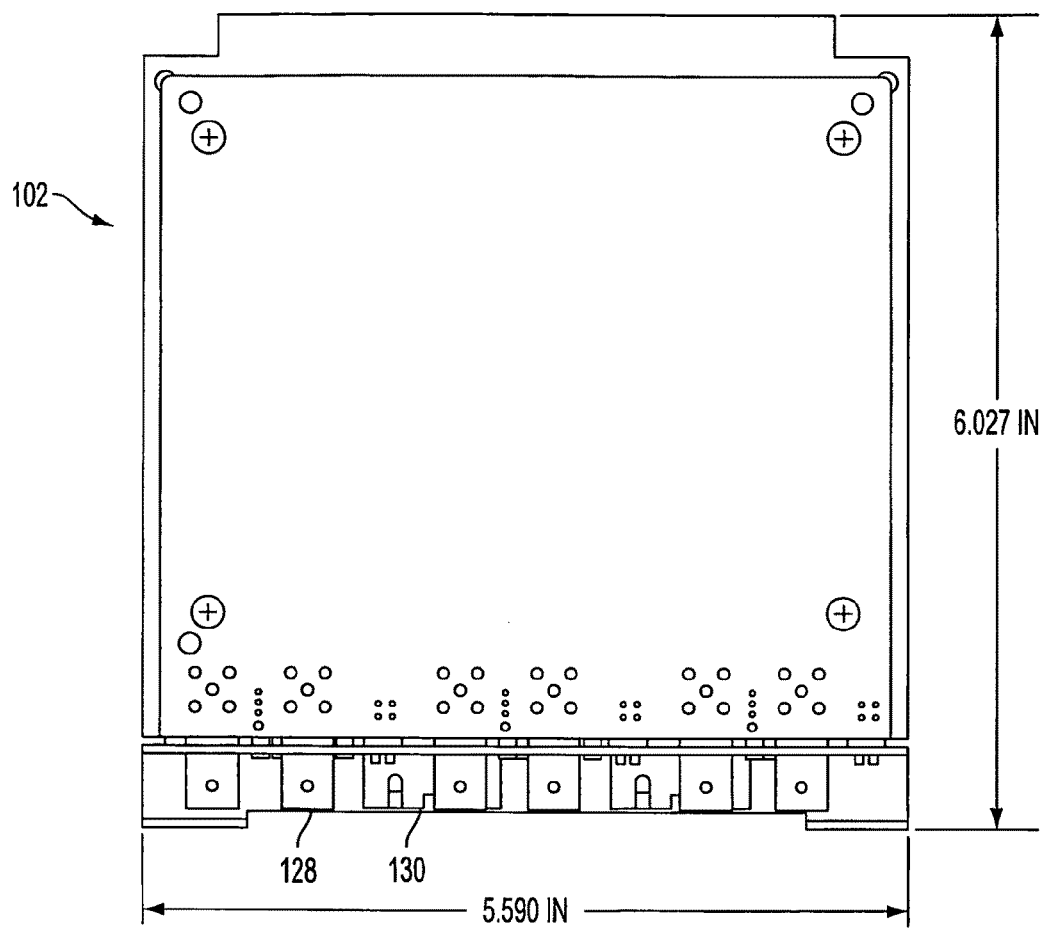
FIG. 13 is a right-side view of the O3-3D3 module shown in FIGS. 10 and 11.
Figure 14:
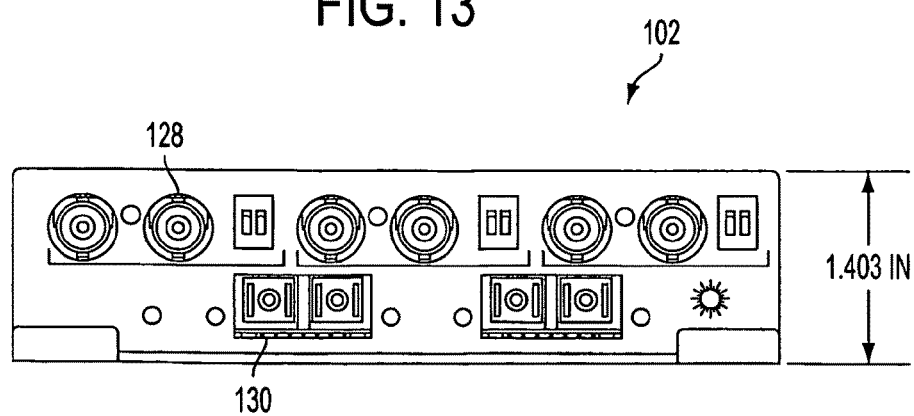
FIG. 14 is a front view of the O3-3D3 module shown in FIGS. 10 and 11.

FIGS. 11-16 show a more detailed view of the O3-3D3 module 102 as shown in FIG. 3. Specifically, as indicated, the module 102 includes a face plate 126 to which are mounted a plurality of coaxial connectors 128 and a plurality of duplex optical fiber connectors 130. It is noted that unlike previous modules, the coaxial connectors 128 and the optical fiber connectors 130 are mounted on the face plate 126 to provide easier access to them without having to remove the module 102 from the assembly 100. The module 102 further includes a card extractor 132 that allows ease in removing the module 102 from the assembly 100. As indicated in FIGS. 13 and 14, the module 102 has an overall height of 5.590 inches (about 5.6 inches), and overall width of 1.403 inches (about 1.4 inches), and an overall depth of 6.027 inches (about 6 inches).

As can be appreciated by one skilled in the art, the O3-3D3 module 102 is designed to derive three DS3 circuits from an OC3 synchronous optical network (SONET) 1550 nm or 1310 nm optical facility, and is configured to be inserted into opening 118 or 120 of enclosure assembly 106 (see FIG. 4). Specifically, due to its standard Type 400 mechanics circuit board arrangement, the O3-3D3 module 102 as well as similar DS3-to-DS1, DS1, WDM and DS3 Express modules can be inserted into any available card slot.

Figure 15:
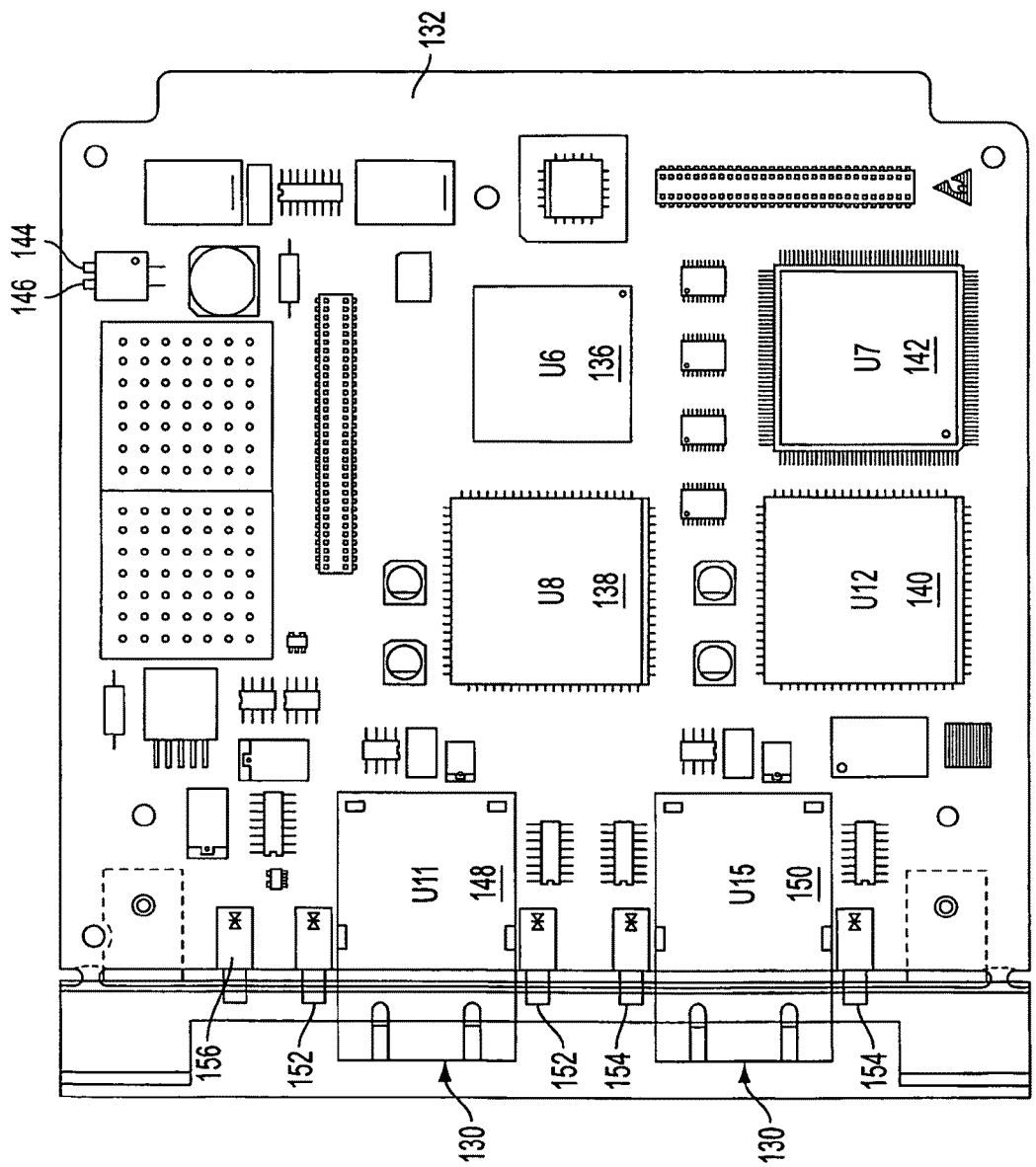
FIG. 15 is a plan view of a lower circuit board contained in the O3-3D3 module shown in FIGS. 11 and 12.
Figure 16:
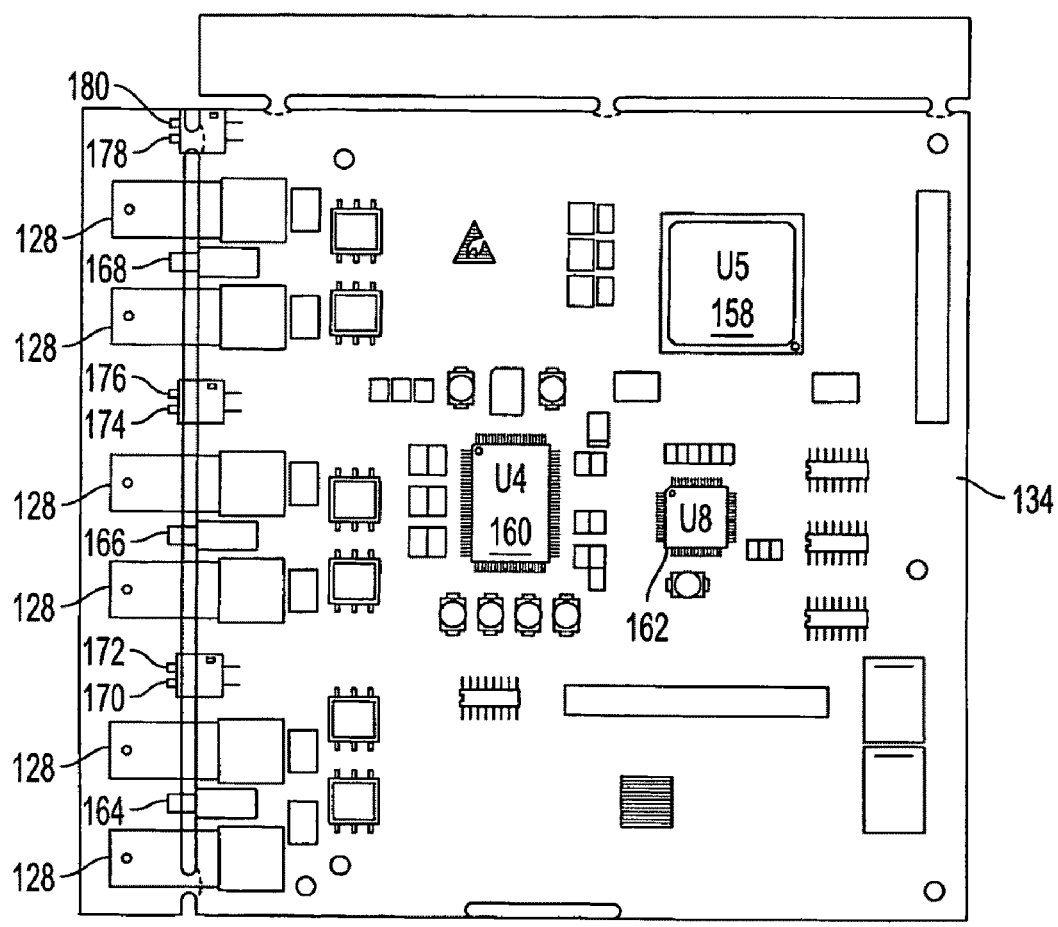
FIG. 16 is a plan view of an upper circuit board contained in the O3-3D3 module shown in FIGS. 11 and 12.
Figure 17:
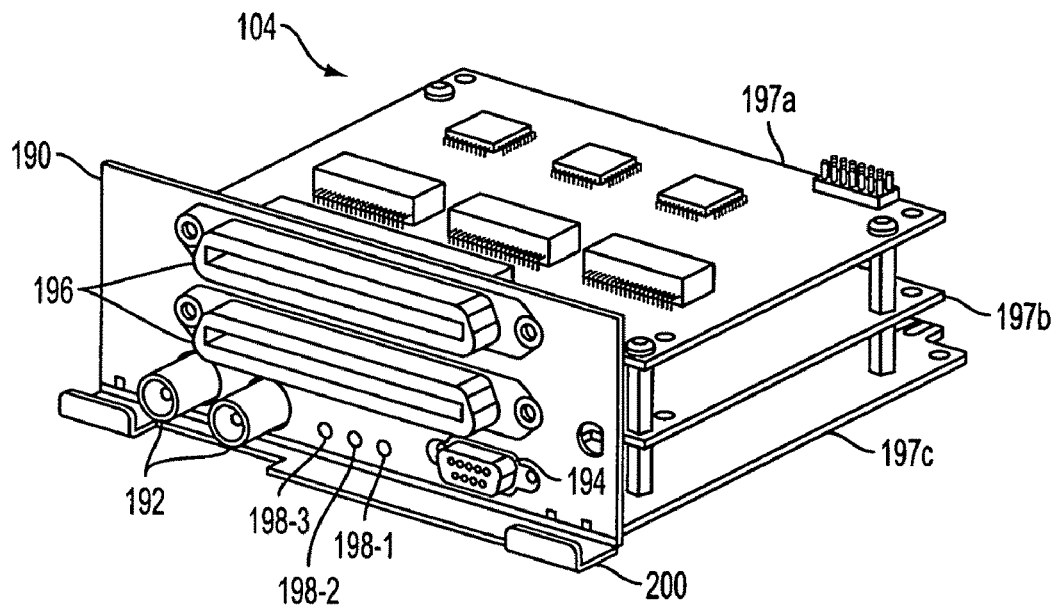
FIG. 17 is a perspective view of the D3-28D1 module used in the enclosure as shown in FIG. 3.
Figure 18:
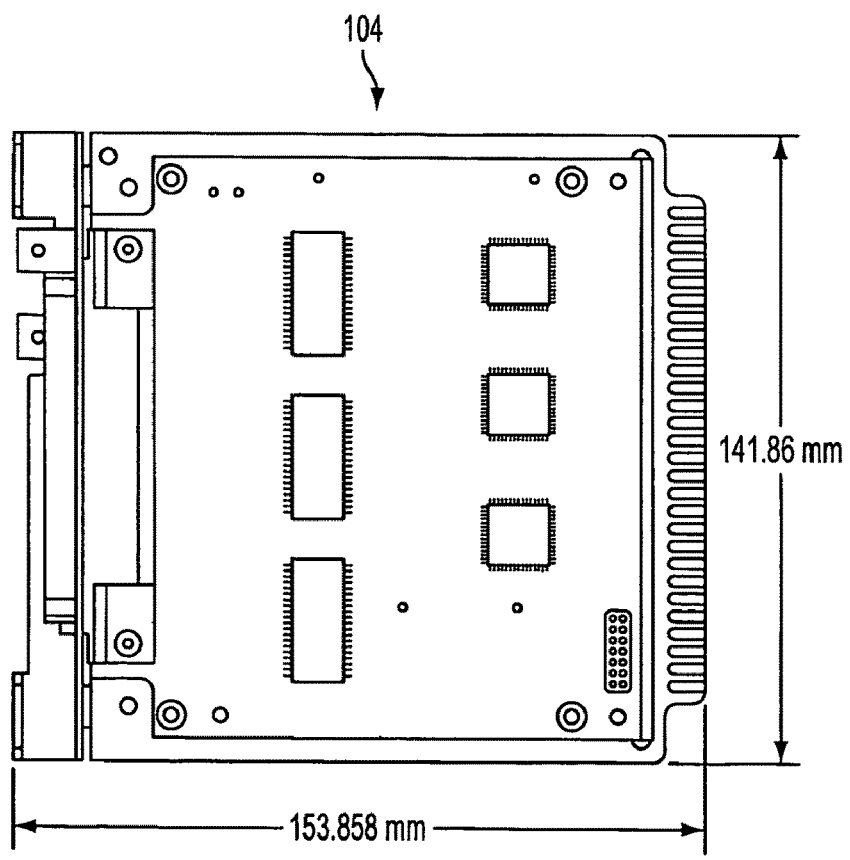
FIG. 18 is a right-side view of the D3-28D1 module shown in FIG. 17.

As shown in FIGS. 15 and 16, in particular, the face plate 126 is mounted to two circuit boards 132 and 134. The main or lower circuit board 132 shown in FIG. 15 comprises a field programmable gate array (FPGA) U16 indicated at 136, two SONET synchronizers U8 and U12 indicated at 138 and 140, respectively, a SONET overhead terminator U7 indicated at 142, switches 144 and 146, an optical transceiver U11 indicated at 148 which is connected to an optical fiber connector 130, and an optical transceiver U15 indicated at 150 which is connected to the other optical fiber connector 130. The main or lower circuit board 132 also comprises OC3 status LEDs 152 and 154, and a UNIT status LED 156.

The upper board 134 shown in FIG. 16 comprises a Mapper U5 indicated at 158, a Triple DS3 Line Interface Unit U4 indicated at 160, a DS3 jitter attenuator U8 indicated at 162, and the coaxial connectors 128 which act as DS3 ports. The upper board 134 also comprises DS3 status LEDs 164, 166 and 168, and switches 170, 172, 174, 176, 178 and 180. Additional components such as heat sinks, the connector between the boards 132 and 134, the card connector, and other circuits that support the operation of the boards 132 and 134 are provided on the boards 132 and 134. Further details of the operation of module 102 are described in the above-mentioned co-owned patents (e.g., U.S. Pat. Nos. 7,359,410 and 7,379,481). Briefly, an optical signal is converted to an electrical format by the optical transceiver 148. A clock data recovery unit or CDRU (not shown) obtains the receive clock frequency and receive path optical rate to separate the clock and data and provide the data to an optical line interface unit. The output of the transceiver 148 is processed to determine the boundaries between each bit. This processing is performed by the SONET synchronizers 138 and 140. The data is accepted by the SONET overhead terminator 142 which finds the start of each 125 microsecond frame and extracts certain bytes called overhead. Overhead is data in the SONET stream which is not the customer's data. It is additional data used to perform administrative functions such as switch to protect operations. The SONET overhead terminator 142 uses a pointer mechanism to locate the bytes within the SONET stream which are customer data. The module 102 of the present invention can be provided with an optional second OC3 port which can be used to provide protection switching. The optical transceiver 150, a CDRU, and optical line interface unit support the second OC3 port. These devices operate with respect to the second OC3 feed in the same manner as stated above in connection with the primary optical transceiver 148, CDRU, and optical line interface unit and the primary OC3 feed. The pointer and the customer data are handed to the mapper 158 where it is divided into three DS3 streams. The triple DS3 LIU 160 converts three streams of digital data into three standard analog interfaces. The module 102 components are bi-directional. The DS3 LIU 160 accepts three analog signals and converts them to digital format. The mapper 158 accepts the three digital streams and converts them to a single digital stream in the SONET format. The SONET overhead terminator 142 appends the overhead data to the data received from the mapper 158. Each SONET synchronizer 138, 140 provides the appropriate drive to the corresponding optical transceivers 148 and 150.

As can be appreciated from the above, the O3-3D3 module 102 is provided with a number of advantageous features such as three coaxial connectors 128 (DS3 ports), and two optical fiber connectors 130 (OC3 ports) on the face plate. Thus, a user has easy access to the coaxial connectors 128 and optical fiber connectors 130 without having to remove the module 102 from the enclosure assembly 106, or without having to access the coaxial connectors 128 and optical fiber connectors 130 via the rear of the enclosure assembly 106. Accordingly, coaxial jumpers can be used to couple the coaxial connectors 128 to coaxial connectors on other modules as explained in more detail below. This capability is made possible because the enclosure does not have dedicated card slots and the units have faceplate connectors. Standard DS3 75-ohm BNC connections can be used as the coaxial connectors 128, and standard fiber SC interface connectors can be used as the optical fiber connectors 130.

As described in more detail in the above-mentioned co-owned patents (e.g., U.S. Pat. Nos. 7,359,410 and 7,379,481), the O3-3D3 module 102 is configured with a drop-and-continue ring capability with or without protection switching that is substantially easier to use and less costly than existing multiplexers such as those described above. Whereas existing multi-shelf and/or multi-card multiplexers require substantial configuration and provisioning to achieve merely an operable data path, the O3-3D3 module provides exceptionally simple plug-and-play installation and use in various applications. The O3-3D3 module 102 uses standard Type 400 mechanics to permit installation in the enclosure assembly 106 as discussed above, as well as in inexpensive wall, shelf, or self-contained housings within a central office (CO), digital loop carrier (DLC), or remote terminal (RT) facilities or customer-premises equipment (CPE). The O3-3D3 module 102 is also climate-hardened for unrestricted deployment in outside plant (OSP) cabinets.

It should also be noted that the O3-3D3 module 102 is provided with 1310 nm or 1550 nm optics that can be used with Wave Division Multiplexing (WDM) couplers, such as those depicted in FIGS. 21-26 and described in more detail below. The O3-3D3 module has either medium-range optics to economically support fiber facilities of up to 40 kilometers, or long-range optics to support extended range (ER) applications up to 80 kilometers, as described below. Furthermore, the O3-3D3 module 102 employs comprehensive and continuous monitoring of the optical local and remote loss of frame, loss of signal, out of frame, loss of pattern, loss of pointer, optical degradation, blown fuse, unit failure, and loss of power with universal contact closure alarm reporting. The O3-3D3 module is also provided with a remote alarm indication signal and loopback capability for comprehensive network and maintenance monitoring, and allow for fiber-to-fiber operation with traditional OC3 SONET multiplexers.

Further details of the D3-28D1 module 104 shown in FIG. 3 will now be described with respect to FIGS. 17-20. Specifically, the module 104 includes a faceplate 190 to which are mounted a plurality of 75-ohm coaxial connectors 192, a connector 194, a plurality of 64 pin AMP™ connectors 196, and a plurality of cards 197a, 197b and 197c. The faceplate 190 also includes a plurality of LEDs 198-1, 198-2 and 198-3 indicating different statuses of the operation of the module 104, such as DS1, DS3, and UNIT status, and a card extractor 200 which allows for ease of removing the module 104 from the assembly 100. Thus, a user has easy access to the coaxial connectors 192 and other connectors without having to remove the module 102 from the enclosure assembly 106, or without having to access the connectors via the rear of the enclosure assembly 106.

As indicated, the faceplate 190 has an overall height of 5.590 inches (141.98 mm), and overall width of 2.25 inches (57.25 mm). The module 104 has an overall depth of 6.57 inches (153.858 mm), and the cards each have an overall height of 5.59 inches (141.86 mm). The card extractor 200 extends 0.58 inches (14.77 mm) from the front surface of the face plate 190. Also, the individual cards have respective heights of 4.94 inches (125.57 mm), 5.04 inches (127.93 mm), and 5.45 inches (138.32 mm). Card 197c and middle card 197b are separated by 0.58 inches (14.8 mm), and card 197a and middle card 197b are separated by 0.78 inches (19.8 mm). It is noted that all dimensions given above can be viewed as approximate. However, in this embodiment, the dimensions can be viewed as the maximum dimensions which should not to be exceeded.

As can be appreciated by one skilled in the art, the D3-28D1 DS1 module 104 multiplexes 28 DS1 signals into a DS3 signal and demultiplexes a DS3 signal to 28 DS1 signals. It is also noted that the module 104 can be configured as a D3-14D1 DS1 module which multiplexes 14 DS1 signals into a DS3 signal and demultiplexes a DS3 signal to 14 DS1 signals. The D3-28D1 DS1 module 104 provides two kinds of management interfaces, namely, the craft port connector 194 on the front panel connects to a PC using VT-100 terminal emulation, and the RS-232 asynchronous network management port on the backplane uses TL-1 messages for maintenance and diagnostic functions. The D3-28D1 DS1 module 104 thus provides industry's smallest, self-contained DS3 to DS1 multiplexer. The module 104 provides drop-and-continue capability optimized for efficient access. For example, a single digital cross-connect system (DCS) or next generation digital loop carrier (NGDLC) DS3 port can deliver four DS1s to seven different sites. The module 104 also provides available support for standard in-band DS1 NIU loopbacks as well as integral T1 repeaters ("SJ" versions) to eliminate the need for external "smart jacks" and connection to standard T1 lines of up to 6000 feet, and available support for in-band loopback codes issued on either the DS1 side or the DS3 side to suit comprehensive network diagnostics. The module 104 further has outside plant (OSP) climate hardening, and robust lightning protection to withstand the rigors of cell site applications, such as in 3G networks.

The module 104 further provides for OSP, central office (CO), and customer-premises equipment (CPE) mountings with provision for complementary O3D3 and O3-3D3 miniature synchronous optical network (SONET) multiplexers and wave division multiplexer (WDM) units. The module 104 also provides simple, intuitive craft port provisioning and pre-assigned defaults for common applications to assure fast, trouble-free turn-up, a full-time TL-1 communication link, comprehensive performance monitoring (PM) that eliminates the cost of external DS3 NIUs and delivers single-point platform diagnostics. Alternatively, the module 104 can be configured as a type 400 mechanics 14 DS1 version, instead of a Type 600 mechanics 28 DS1 version as shown.

Figure 21:
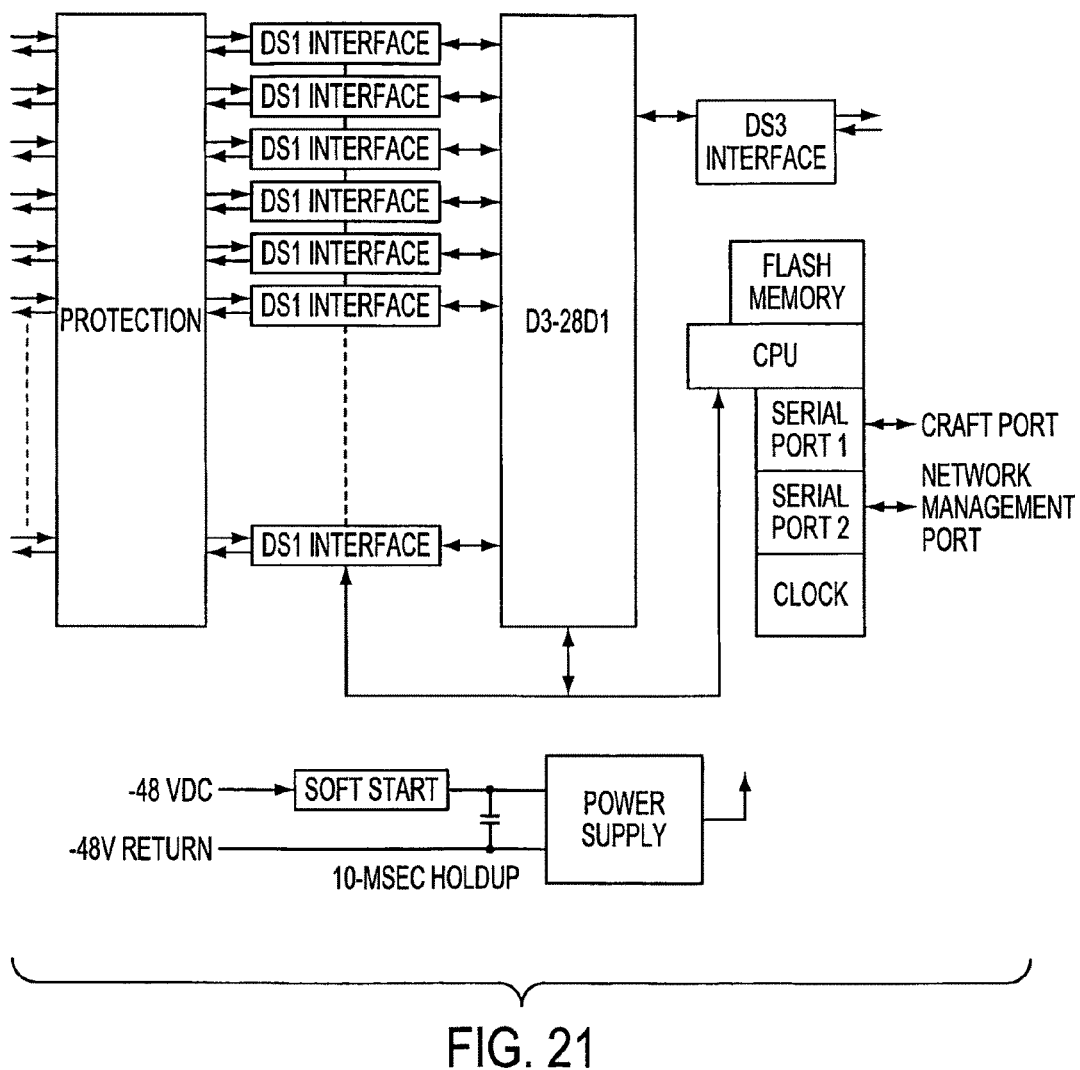
FIG. 21 is a functional block diagram of the D3-28D1 module shown in FIG. 17.

FIG. 21 is a functional block diagram of D3-28D1 module 104 discussed above. As shown, up to 28 DS1 circuits are combined into a single DS3 signal. The D3-28D1 performs multiplexing transparently (no modification of DS1 payload). FIG. 3 shows a functional block diagram. The DS3 interface is compliant with GR-499-CORE Section 9.6, Table 9-15. It detects alarm indication signal (AIS), remote defect indicator (RDI), and IDLE signal per GR-499-CORE Sections 10.5, 18.2, and 18.3. The DS3 transmitting pulse template meets T1.404. The interface supports bipolar with 3-zero substitution (B3ZS) line code and M-Frame and C-bit parity framing formats.

Each DS1 is provisioned for alternate mark inversion (AM1) or bipolar with 8-zero substitution (B8ZS) line coding. Each DS1 is transparent to superframe (SF) and extended superframe (ESF) formats. Each DS1 pulse template meets ANSI T1.102. Each DS1 port is provisioned for digital signal cross-connect (DSX-1) type interface (short haul), with line build-outs (LBOs) appropriate to service line lengths from 0 to 655 feet. Each DS1 port of the DS-28D1SJ and DS-14D1SJ may also be provisioned for long-haul applications; the transmit attenuation in these versions is also selectable for 0, 7.5, 15, or 22.5 dB. The D3-28D1 detects loss of signal (LOS), all ones (AIS), and line code violations (LCVs) for each DS1 on the low-speed (DS1) side. There are two alarm relays on the D3-28D1. The DS3 alarm contacts close for a DS3 failure. The DS1 alarm contacts close for LOS or loss of frame (LOF)

on any IN-SERVICE DS1 port. Both DS3 and DS1 alarm contacts close for a loss of power or unit failure.

The front panel of the D3-28D1 module 104 provides connection to the DS3 and DS1 signals as well as the craft port. As discussed above, LEDs 198-1, 198-2 and 198-3 show connector and unit status. Each DS1 connector has 14 transmit (Tx) pairs and 14 receive (Rx) pairs. The front-panel DB-9 communications interface is an asynchronous VT-100 serial port. The craft port 194 operates at 9600 baud with 8 bits of data, no parity, and 1 stop bit.

Figure 22:
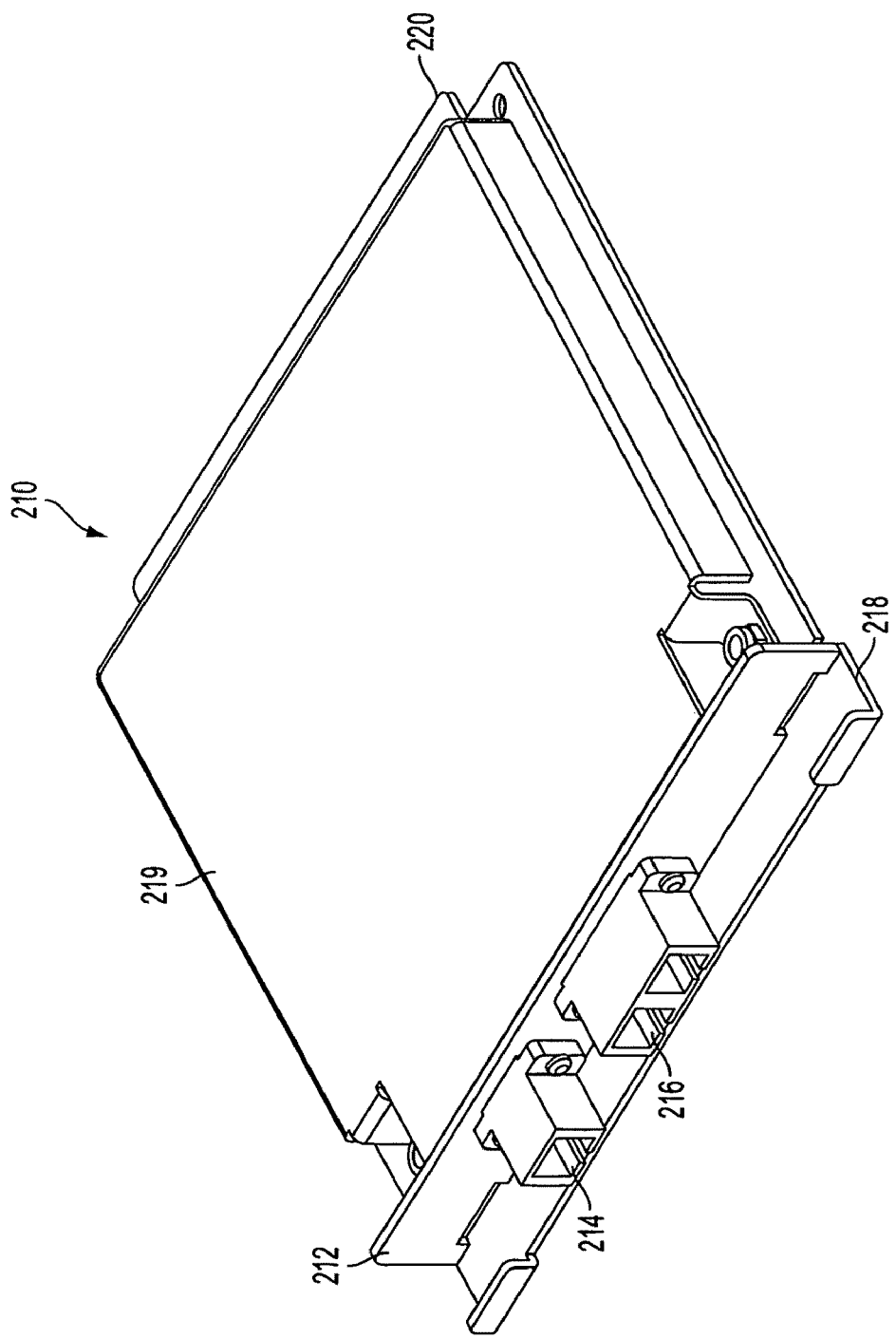
FIG. 22 is a perspective view of a WDM-1 coupler module that can be used with the assembly as shown in FIG. 3.
Figure 23:
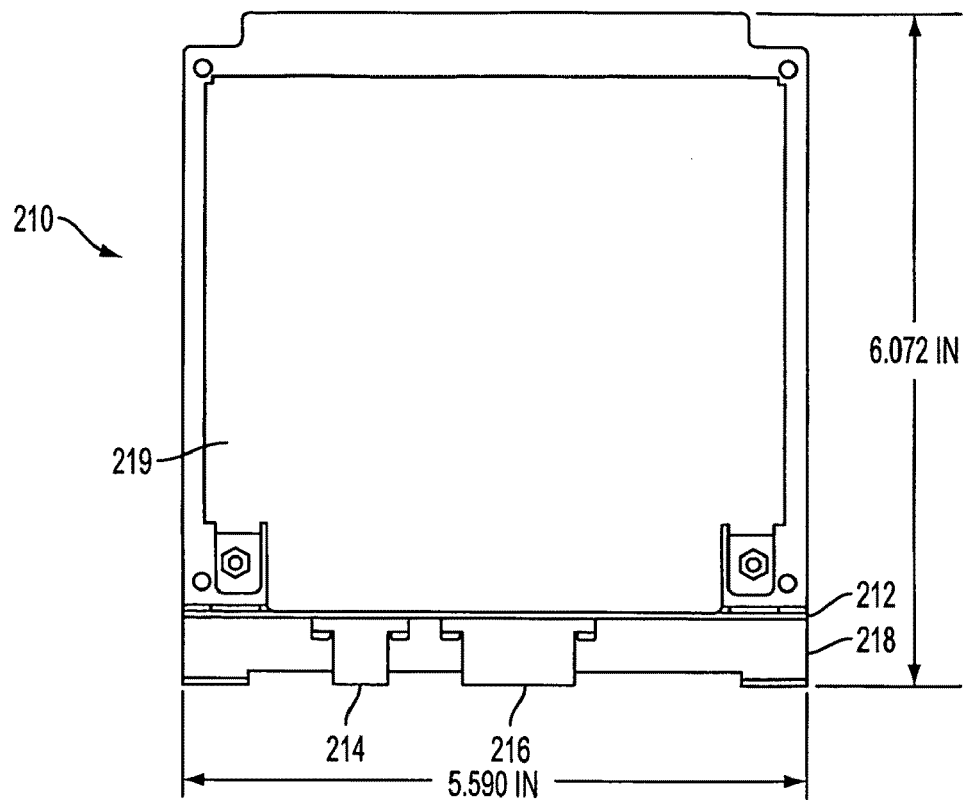
FIG. 23 is a side view of the WDM-1 module shown in FIG. 22.
Figure 24:
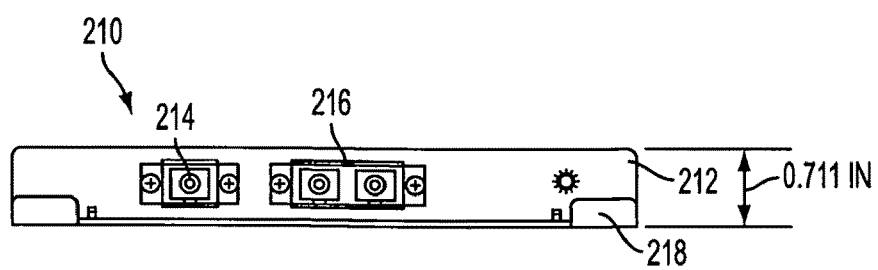
FIG. 24 is a front view of WDM-1 module shown in FIG. 22.

As discussed above, the assembly 100 is capable of receiving O3-3D3 modules 102 and D3-28D1 module 104. In addition, and as discussed in more detail below, the assembly 100 is capable of receiving one or more Wave Division Multiplexing (WDM) modules as shown in FIGS. 22-27. That is, FIGS. 22-24 illustrate an example of a WDM-1 module 210. The module 210 includes a faceplate 212 to which are mounted a single fiber connector 214 and a duplex fiber connector 216. Also, a card extractor 218 is mounted to the front panel 212 to allow for ease of removing the module 210 from the assembly 100, and a protective cover 219 is provided for protection. The printed circuit board 214 that is mounted in the module 210 has contacts 220 at its back end which mate with a respective connector 122 inside the enclosure assembly 106 (see FIG. 6) of the assembly 100 when the module 210 is loaded into the enclosure 106. As shown in FIGS. 22-24, the module 210 has an overall height of 5.590 inches, and overall width of 0.711 inches, and an overall depth of 6.072 inches. It is noted that all dimensions given above can be viewed as approximate. However, in this embodiment, the dimensions can be viewed as the maximum dimensions which should not to be exceeded.

Figure 25:
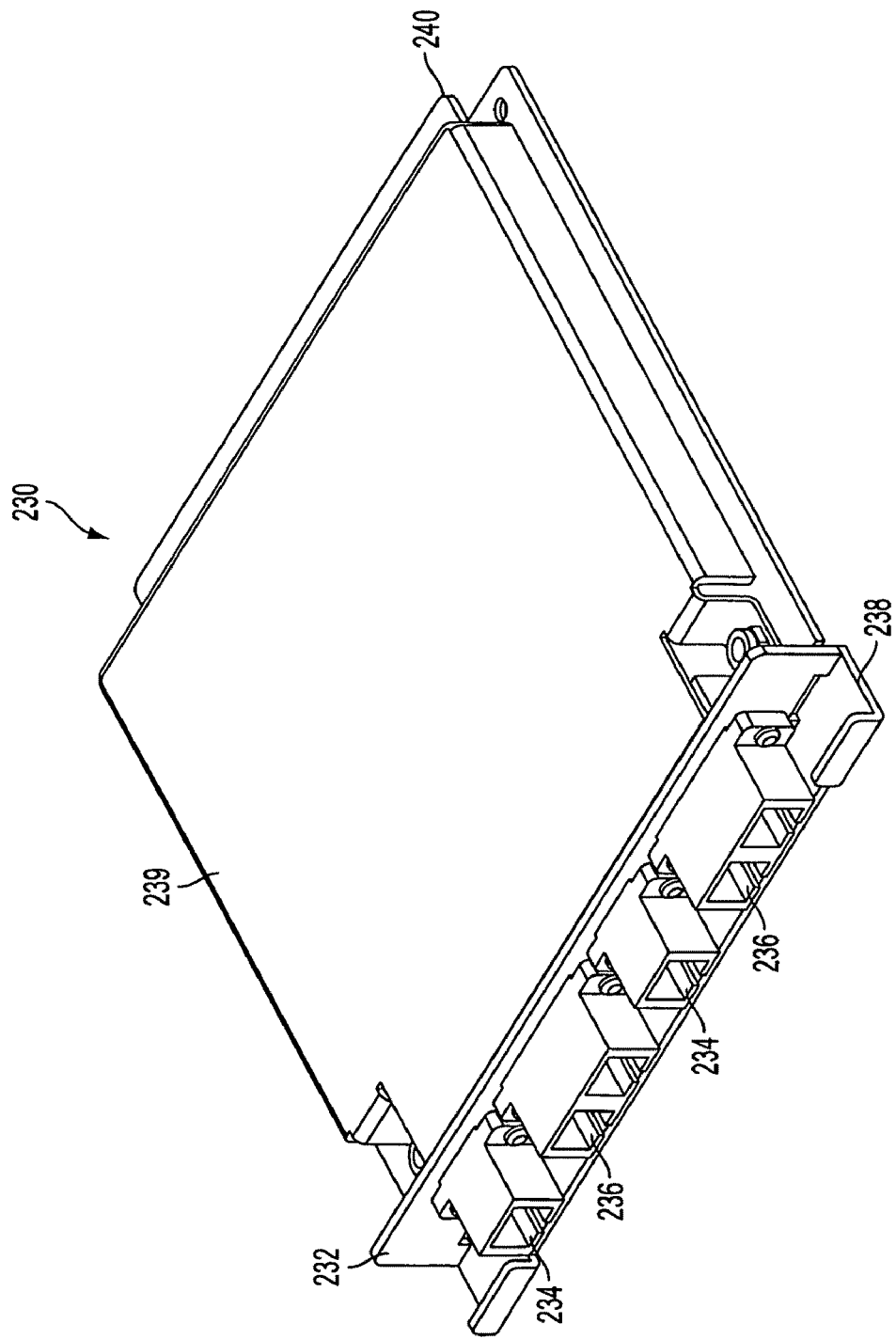
FIG. 25 is a perspective view of a WDM-2 coupler module that can be used with apparatus shown in FIG. 3.
Figure 26:
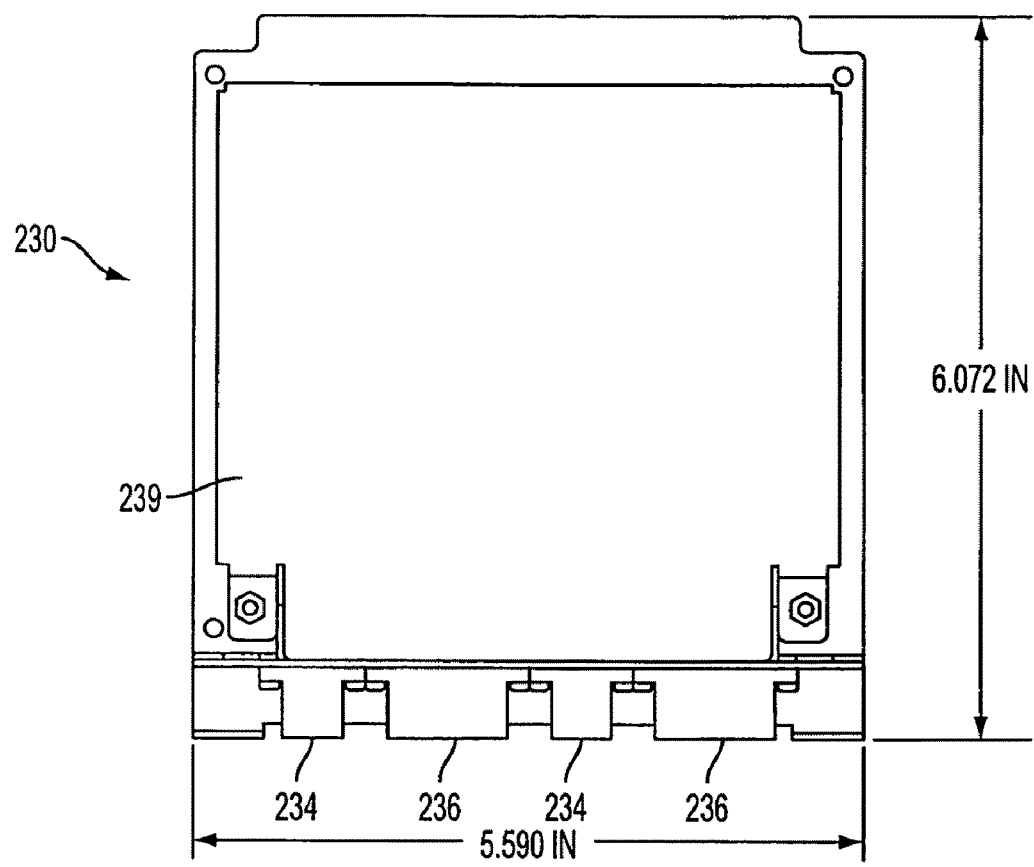
FIG. 26 is a right-side view of the WDM-2 module shown in FIG. 25.
Figure 27:
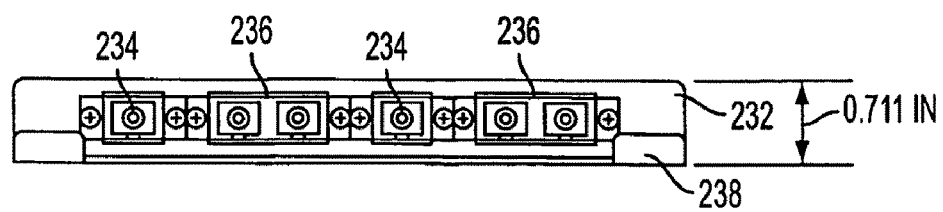
FIG. 27 is a front view of WDM-2 module shown in FIG. 25.

FIGS. 25-27 illustrate details of a WDM-2 coupler module 230 that can be installed in the assembly 100. As indicated, the module 230 include a face plate 232 to which are mounted a plurality of single fiber connectors 234 and duplex fiber connectors 236. A card extractor 238 is also mounted to the front panel 232 to allow for ease of removal of the module 230 from the assembly 100, and a protective cover 239 is provided for protection. A printed circuit board contained in the module 230 has contacts 240 at its back end which mate with a respective connector 122 in enclosure assembly 106 (see FIG. 6) of assembly 100 when the module 230 is inserted into the enclosure assembly 106. As indicated, the dimensions for module 230 are similar to those for module 210.

As can be appreciated by one skilled in the art, the WDM-1 module 210 and WDM-2 module 230 in this example are 200 Mechanics® Wave Division Multiplexing Couplers. The WDM-1 module 210 is a single coupler for single fiber transport between a 1310 nm O3D3 or O3-3D3 at one end of a circuit and a 1550 nm O3D3 or O3-3D3 at the other end of a circuit. The WDM-2 module 230 is a dual coupler for two fiber switch-to-protect application, and can also increase the capacity over fibers already in use by legacy optical multiplexers. When used with an O3D3 multiplexer, the WDM-1 and WDM-2 modules permit a single fiber to carry both transmit and receiver payloads to address fiber exhaustion, and serve applications such as support of digital subscriber line (DSL) delivery from legacy carrier systems. The WDM-1 and WDM-2 modules 210 and 230 thus provide simple hand-in-glove use with O3D3 and O3-3D3 modules as discussed above. The Type 200 Mechanics® configuration permits installation in conventional, inexpensive, central office (CO) digital loop carrier (DLC) remote terminal (RT) or customer-premise equipment (CPE) wall, shelf or self-contained housing. The WDM-1 and WDM-2 modules 210 and 230 also are climate-hardened for unrestricted deployment in outside plant (OSP) cabinets, and perform derivations of 1310 nm and 1550 nm single-node channels from a single fiber. The printed circuit board shroud prevents fibers from becoming entangled in other equipment. The modules 210 and 230 further include SC bulkhead OC3 connectors, require only simple installation without special mounting plates or brackets, and meet GR-2899-CORE criteria in O3D3, O3-3D3 and similar applications.

Figure 28A:
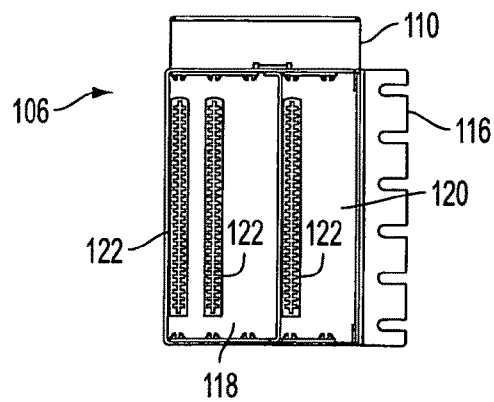
FIGS. 28a-f illustrates examples of optional module configurations that can be used in the assembly shown in FIG. 3.
Figure 28B:
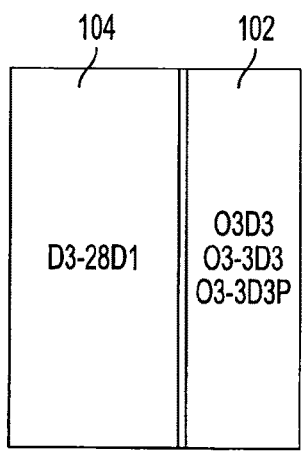
Figure 28C:
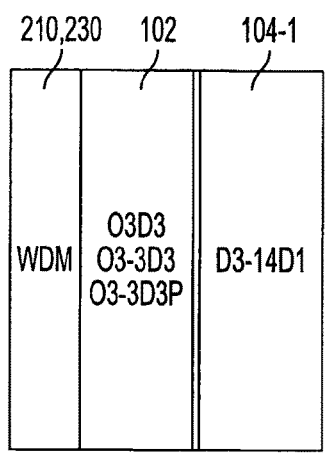
Figure 28D:
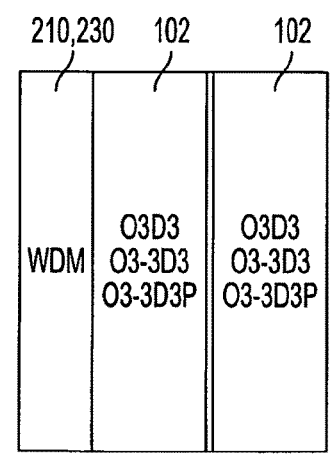
Figure 28E:
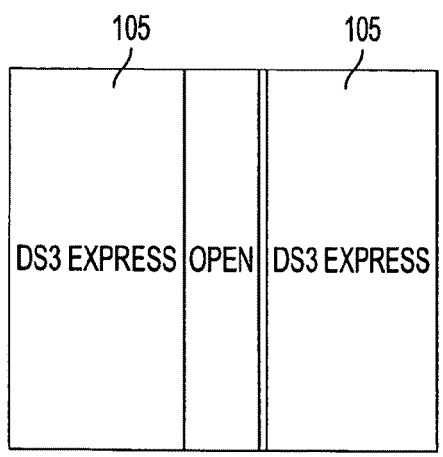
Figure 28F:
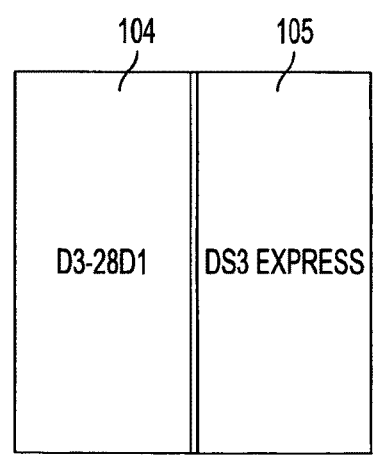

As discussed above, the enclosure 108 is capable of receiving various combinations of the types of modules described above. Several examples of this configuration are shown in FIGS. 28*a-f*. FIG. 28*a* shows an empty enclosure assembly 106 as shown in FIG. 6. As shown in FIG. 28*b*, the assembly 100 can receive a single O3-3D3 module 102, or similar modules O3D3 and O3-3D3P, as well as one D3-28D1 module 104 or other D3-XD1 module 104-1 for O3-XD1 operation. As shown in FIG. 28*c*, the assembly 100 can receive any of the WDM modules (i.e., WDM-1 or WDM-2) 210 or 230 as discussed above, as well as module 102 and a D3-14D1 or D3-XD1 module 104-1 as discussed above. As shown in FIG. 28*d*, the assembly 100 can receive two O3-3D3 modules 102, and anyone of the WDM-1 or WDM-2 modules 210 or 230 as indicated. As shown in FIG. 28*e*, the assembly 100 can receive two DS3 Express modules 105. These modules, permit a high speed DS3 circuit to be carried over four standard twisted pair cables. As shown in FIG. 28*f*, the assembly 100 can receive a D3-28D1 module 104, and a DS3 Express module 105.

The O3-3D3 module 102 is configured with a drop-and-continue ring capability with or without protection switching that is substantially easier to use and less costly than existing multiplexers such as those described above. Whereas existing multi-shelf and/or multi-card multiplexers require substantial configuration and provisioning to achieve merely an operable data path, the O3-3D3 module 102 provides exceptionally simple plug-and-play installation and use in various applications. As stated above, the O3-3D3 module 102 preferably uses standard Type 400 mechanics to permit installation in inexpensive wall, shelf, or self-contained housings within central office (CO), digital loop carrier (DLC), or remote terminal (RT) facilities or customer-premises equipment (CPE). The O3-3D3 MUX is also climate-hardened for unrestricted deployment in outside plant (OSP) cabinets.

Figure 11:
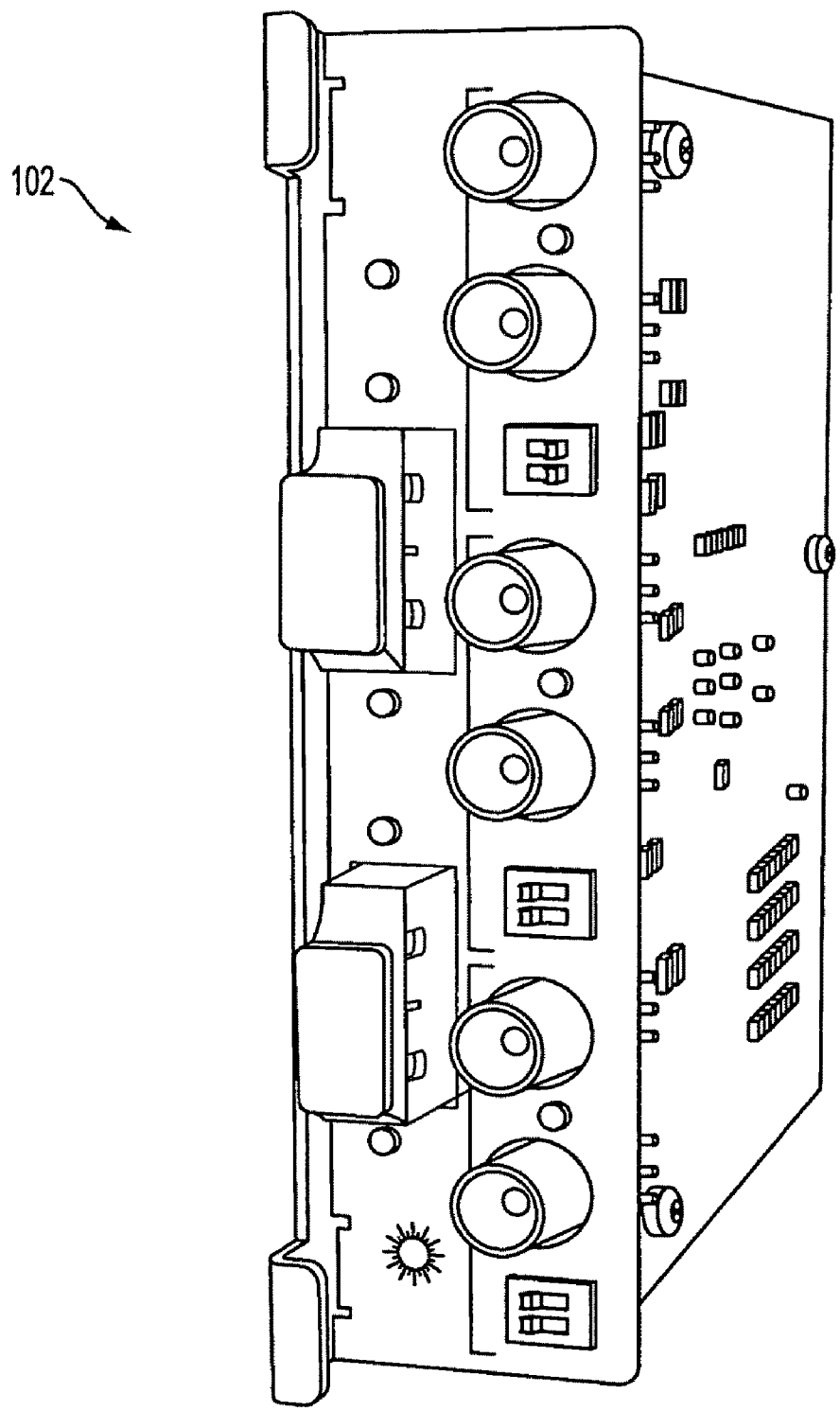
FIG. 11 is a perspective view of a O3-3D3 module used in the enclosure shown in FIGS. 3 and 4.
Figure 12:
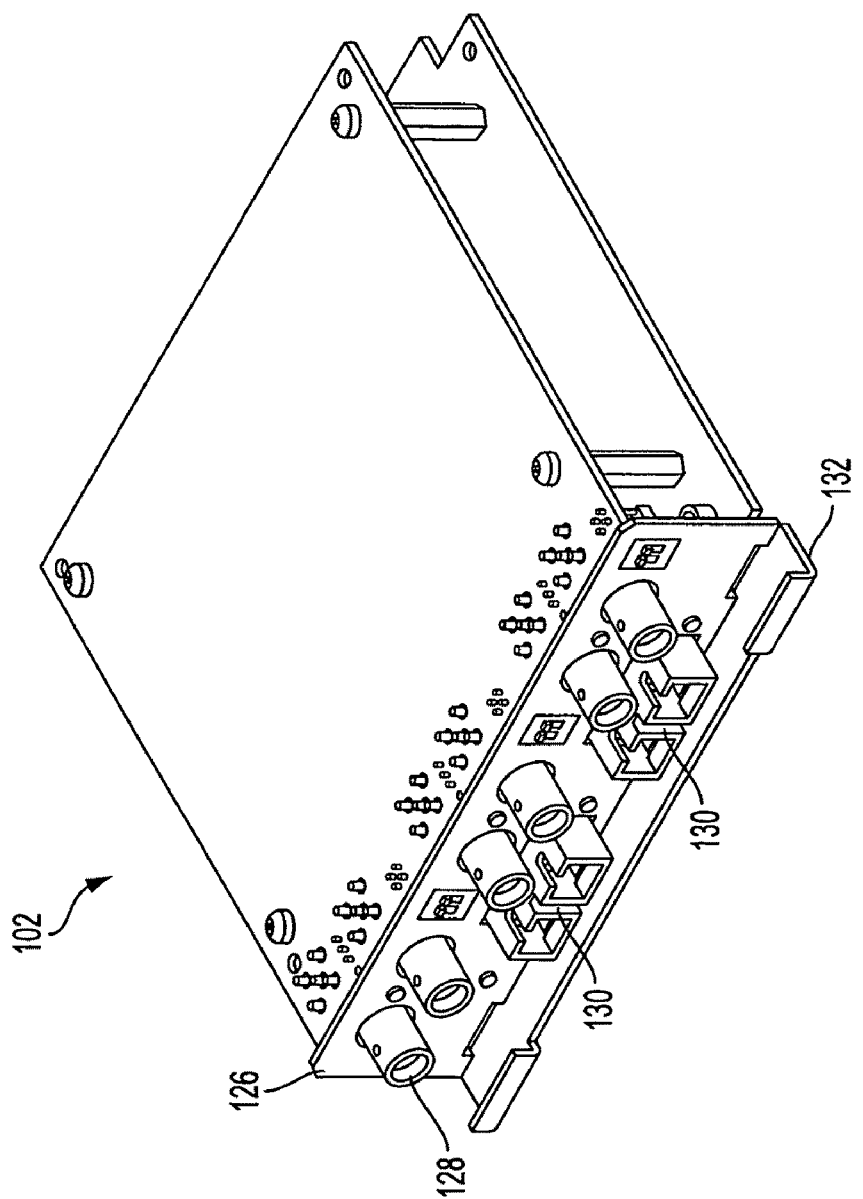
FIG. 12 is another perspective view of the O3-3D3 module shown in FIG. 10.

As shown in FIGS. 11 and 16, the six switches 170, 172, 174, 176, 178 and 180 correspond to two types of switches allowing user selection of two respective parameters for each of three DS3 ports indicated by the three pairs of connectors 128 in FIG. 16 to the SONET multiplexer module 102. The two types of switches allow the user to select, respectively, the line build out parameter (i.e., long or short) and continue parameter (i.e., yes for continue/drop if the DS3 is to be sent out via an OC3 port, or no if the DS3 is to be dropped and sent out as a DS3) for the corresponding DS3 port.

The continue/drop selection for each DS3 port via a simple switch position selection via its corresponding switch 170, 174 and 178 represents a significant advantage over existing SONET multiplexers. The drop application is illustrated in FIG. 6 of the afore-mentioned U.S. Pat. No. 7,379,481, and the drop and continue ring application is illustrated in FIG. 5 of the afore-mentioned U.S. Pat. No. 7,379,481. Each of the four O3-3D3 SONET multiplexer modules 102 of the present invention used in such an application need only have the ring respective CONTINUE switches switched to the Y position (i.e., yes) to enable the data paths needed for this application. By contrast, if four Fujitsu Multiplexers 10 were to be deployed in such a ring configuration, each Fujitsu Multiplexer 10 would require substantial provisioning to instruct the unit regarding which data paths are being used, as well as alarm conditions, among other configuration data.

The advantages of the SONET multiplexer module 102 of the present invention over existing systems such as the Fujitsu Multiplexer 10 is also illustrated when only a subset of the ports are used. For example, if only two of the three DS3 ports of the SONET multiplexer are employed in an application, the CONTINUE switches indicate which of the three ports is not being used, thereby eliminating the need for an alarm. By contrast, if only two ports of the Fujitsu Multiplexer 10 are used, the unit must be provisioned to tell it how to cross-connect DS3s at each point of an application such as the ring configuration (FIG. 5). As stated previously, each data path must be completely configured, otherwise, the Fujitsu Multiplexer 10 will not operate. The SONET multiplexer module 102 of the present invention has preconfigured data paths and operates upon mere power up, in addition to the paths being simply reconfigurable via the switches 170, 174 and 178. Further, a node created through provisioning of a Fujitsu Multiplexer 10 can be completely torn down or rendered inoperable by an incorrect key stroke on the computer running the provisioning application during the provisioning process. The SONET multiplexer module 102 of the preset invention, on the other hand, eliminates the need for any such computer, as well as the associated risk than an incorrect keystroke would disrupt operation.

The SONET multiplexer module 102 of the preset invention simplifies provisioning a number of ways such as by basing system timing and synchronization on an internally generated clock (i.e., a DS3-based clock imbedded in SONET), as opposed to making system timing a provisionable parameter as in existing systems (e.g., which provide a user with choices such as SONET and global positioning system (GPS) timing). In addition, the SONET multiplexer module 102 of the preset invention provides users with one predetermined interface (i.e., OC3 to DS3) and therefore does not require T1 provisioning or provisioning as to connections with DS1, DS2, OC12, among others, as do existing SONET multiplexers. The SONET multiplexer module 102 is configured as a single card and therefore does not require equipment provisioning (e.g., for multiple cards) as do existing SONET multiplexers. Since the SONET multiplexer module 102 provides simple switches, no security provisioning is needed to prevent unauthorized remote access, unlike existing SONET multiplexers requiring a user interface via a computer and therefore possibly using passwords or other security measures.

As stated above, existing SONET multiplex equipment generally requires at least one equipment shelf with multiple cards, or at least, multiple cards to achieve such functions as data path control, alarms, switch protection, synchronization, and monitoring operations, among other functions. The Fujitsu Multiplexer 10 uses several cards to provide OC3 to DS3 to DS1 multiplexing. The existing form factors (e.g., equipment shelves for bay installation and cards for use in bay shelves) are largely due to the development of SONET multiplex equipment using components such as microprocessors and other integrated circuits that are interfaced via microprocessor and corresponding software to interoperate these components.

In accordance with an aspect of the present invention, a SONET multiplexer module 102 is provided to perform OC3 to DS3 multiplexing and demultiplexing operations using a substantially reduced form factor as compared with existing SONET equipment that can perform the same multiplexing functions. The SONET multiplexer module 102 of the present invention is implemented as a single card (i.e., capable of deployment on a single card slot in a telecommunications bay equipment shelf). As shown in FIGS. 11-16, the card 102 comprises a face plate 126 and two attached circuit boards 132 and 134 referred to as the main or lower circuit board 132 and the upper board 134. The main board 132 comprises a field programmable gate array (FPGA), the operations of which are described in the afore-mentioned U.S. Pat. No. 7,379,481. Thus, the SONET multiplexer module 102 of the present invention is considerably smaller than existing SONET multiplexers having the same functionality, which consist of multiple plug-in cards. While single-card media converters are available to perform optical and electrical signal conversions, they are not able to conform to the GR-499 and GR-253 standards as does the SONET multiplexer module 102 of the present invention.

The reduced form factor of the SONET multiplexer module 102 therefore overcomes many of the disadvantages of existing multi-card SONET multiplexers since it does not require much equipment space. Further, the SONET multiplexer module 102 of the present invention can be deployed as a standalone component and therefore need not be inserted into a bay shelf at all, but instead can be mounted on the side of a bay, on a wall in the equipment area of the CO, RT or other user, on a top of a computer, table or other work surface, among other places.

With continued reference to FIGS. 11-16, the SONET multiplexer module 102 of the present invention allows front panel access to three DS3 ports indicated generally at 128, as well as OC3 ports indicated generally at 130. The single card implementation of the SONET multiplexer module 102 facilitates its use with other cards such as a wave division multiplexer (WDM) and a DS3 to DS1 multiplexer (M13). By way of an example, the O3-3D3 MUX 50 can be used within a high rise building receiving an OC-12 feeder. The O3-3D3 MUX 50 can be used to drop DS3s to different floors. The M13 can also be used to drop DS1s to different floors. The configuration of the O3-3D3, the M13 and the WDM as single-card building components allows different arrangements of these cards in a small profile chassis or enclosure that is independent of equipment shelves for flexible installations. Further, unlike existing SONET equipment, the chassis does not have dedicated card slots.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A SONET multiplexer comprising:
at least one OC3 port operable to receive and transmit optical signals;
at least one electrical connector providing a plurality of lower rate tributary signal ports operable to receive and transmit electrical signals;
an optical interface to receive an optical signal via said at least one OC3 port and convert it into an electrical signal;
a SONET overhead terminator configured to locate SONET frames in said electrical signal received from said optical interface and extract selected overhead bytes in said SONET frames;

a mapper operable to use data from said electrical signal received from said optical interface and said selected overhead bytes to generate a plurality of lower rate tributary signal streams; and a line interface unit operable to convert the said lower rate tributary signal streams into respective analog signals for transmission from said at least one electrical connector, said line interface unit being operable to receive analog signals via said at least one electrical connector and convert them to corresponding digital signals comprising lower rate tributary signals, said mapper being operable to format said digital signals as a SONET stream, said SONET overhead terminator being operable to append selected overhead bytes to said SONET stream for transmission via said optical interface and said at least one OC3 port;

wherein no provisioning is needed to configure said SONET multiplexer to transport data between said at least one OC3 port and at least one of said plurality of lower rate tributary signal ports.

2. A SONET multiplexer as claimed in claim 1, wherein a lower rate tributary signal cable is connected to said at least one electrical connector, said mapper and said line interface unit being operable to automatically add a lower rate tributary signal received via said cable without requiring provisioning.

3. A SONET multiplexer as claimed in claim 1, wherein said SONET multiplexer is deployed as a single card dimensioned for deployment in a card slot in a shelf of a telecommunications bay.

4. A SONET multiplexer as claimed in claim 3, wherein said single card employs Type 400 mechanics.

5. A SONET multiplexer comprising:
at least one OC3 port operable to receive and transmit optical signals;
at least one electrical connector providing a plurality of lower rate tributary signal ports operable to receive and transmit electrical signals;
an optical interface to receive an optical signal via said at least one OC3 port and convert it into an electrical signal;
a SONET overhead terminator configured to locate SONET frames in said electrical signal received from said optical interface and extract selected overhead bytes in said SONET frames;
a mapper operable to use data from said electrical signal received from said optical interface and said selected overhead bytes to generate a plurality of lower rate tributary signal streams; and
a line interface unit operable to convert the said lower rate tributary signal streams into respective analog signals for transmission from said at least one electrical connector, said line interface unit being operable to receive analog signals via said at least one electrical connector and convert them to corresponding digital signals, said mapper being operable to format said digital signals comprising lower rate tributary signals as a SONET stream, said SONET overhead terminator being operable to append selected overhead bytes to said SONET stream for transmission via said optical interface and said at least one OC3 port;
wherein said SONET multiplexer is deployed as a single card dimensioned for deployment in a single card slot in a shelf of a telecommunications bay.

6. A SONET multiplexer as claimed in claim 5, further comprising a face plate facing away from the shelf to allow said at least one electrical connector and said optical connector to be accessible outside of the shelf.

* * * * *